United States Patent
Yoshida et al.

(10) Patent No.: US 11,748,256 B2
(45) Date of Patent: *Sep. 5, 2023

(54) MEMORY SYSTEM AND METHOD FOR CONTROLLING NONVOLATILE MEMORY

(71) Applicant: Kioxia Corporation, Tokyo (JP)

(72) Inventors: Hideki Yoshida, Yokohama Kanagawa (JP); Shinichi Kanno, Tokyo (JP)

(73) Assignee: Kioxia Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/859,686

(22) Filed: Jul. 7, 2022

(65) Prior Publication Data
US 2022/0342809 A1    Oct. 27, 2022

Related U.S. Application Data

(63) Continuation of application No. 16/899,805, filed on Jun. 12, 2020, now Pat. No. 11,416,387, which is a (Continued)

(30) Foreign Application Priority Data

Oct. 27, 2017    (JP) .................................. 2017-208105

(51) Int. Cl.
*G06F 12/02*    (2006.01)
*G06F 12/10*    (2016.01)
(Continued)

(52) U.S. Cl.
CPC ............ *G06F 12/0246* (2013.01); *G06F 3/06* (2013.01); *G06F 3/064* (2013.01);
(Continued)

(58) Field of Classification Search
CPC .. G06F 12/0246; G06F 12/0253; G06F 12/06; G06F 12/10; G06F 2212/1016;
(Continued)

(56) References Cited

U.S. PATENT DOCUMENTS 6,804,674 B2    10/2004    Hsiao et al.
7,512,957 B2    3/2009    Cohen et al.
(Continued)

FOREIGN PATENT DOCUMENTS

JP    2006-164280 A    6/2006
JP    5589205 B2    9/2014
(Continued)

OTHER PUBLICATIONS

Yiying Zhang, et al., "De-indirection for Flash-based SSDs with Nameless Writes," 10th USENIX Conference on File and Storage Technologies (FAST '12), Feb. 14-17, 2012, pp. 1-16.
(Continued)

*Primary Examiner* — Hashem Farrokh
(74) *Attorney, Agent, or Firm* — Allen & Overy LLP

(57) ABSTRACT

According to one embodiment, a memory system includes a nonvolatile memory including plural blocks each including plural pages, and a controller. When receiving a write request designating a first logical address and a first block number from the host, the controller determines a first location in a first block having the first block number to which data from the host should be written, and writes the data from the host to the first location in the first block. The controller notifies the host of either an in-block physical address indicative of the first location, or a group of the first logical address, the first block number and the first in-block physical address.

16 Claims, 24 Drawing Sheets

Related U.S. Application Data continuation of application No. 15/984,944, filed on May 21, 2018, now Pat. No. 10,719,437.

(51) Int. Cl.
 *G06F 12/06* (2006.01)
 *G06F 3/06* (2006.01)

(52) U.S. Cl.
 CPC .......... *G06F 12/0253* (2013.01); *G06F 12/06* (2013.01); *G06F 12/10* (2013.01); *G06F 2212/1016* (2013.01); *G06F 2212/152* (2013.01); *G06F 2212/2022* (2013.01); *G06F 2212/7201* (2013.01); *G06F 2212/7202* (2013.01); *G06F 2212/7205* (2013.01); *G06F 2212/7208* (2013.01)

(58) Field of Classification Search
 CPC ....... G06F 2212/152; G06F 2212/2022; G06F 2212/7201; G06F 2212/7202; G06F 2212/7205; G06F 2212/7208; G06F 3/06; G06F 3/0616; G06F 3/064; G06F 3/067; G06F 3/0688
 USPC .................................. 711/162, 103
 See application file for complete search history.

(56) References Cited

U.S. PATENT DOCUMENTS

| | | | |
|---|---|---|---|
| 7,565,478 B2* | 7/2009 | Bennett | G11C 16/349 711/100 |
| 7,934,049 B2 | 4/2011 | Holtzman et al. | |
| 2002/0002661 A1 | 1/2002 | Blumenau et al. | |
| 2007/0143570 A1 | 6/2007 | Gorobets et al. | |
| 2008/0172519 A1 | 7/2008 | Shmulevich et al. | |
| 2010/0306452 A1 | 12/2010 | Weber et al. | |
| 2011/0055458 A1 | 3/2011 | Kuehne | |
| 2011/0107018 A1 | 5/2011 | Honda | |
| 2011/0119464 A1 | 5/2011 | Karr et al. | |
| 2011/0137966 A1 | 6/2011 | Srinivasan et al. | |
| 2012/0246385 A1 | 9/2012 | Dhandapani et al. | |
| 2012/0284587 A1 | 11/2012 | Yu et al. | |
| 2013/0191580 A1 | 7/2013 | Lasser | |
| 2013/0246721 A1 | 9/2013 | Fukutomi et al. | |
| 2013/0250686 A1 | 9/2013 | Marukame et al. | |
| 2013/0275656 A1 | 10/2013 | Talagala et al. | |
| 2013/0325915 A1 | 12/2013 | Ukai | |
| 2014/0025864 A1 | 1/2014 | Zhang et al. | |
| 2015/0186259 A1 | 7/2015 | Thomas et al. | |
| 2015/0242454 A1 | 8/2015 | Bakre et al. | |
| 2015/0261452 A1 | 9/2015 | Moon et al. | |
| 2015/0370700 A1 | 12/2015 | Sabol et al. | |
| 2016/0041760 A1 | 2/2016 | Kuang et al. | |
| 2016/0062885 A1 | 3/2016 | Ryu | |
| 2016/0170903 A1 | 6/2016 | Kanno et al. | |
| 2016/0283114 A1 | 9/2016 | Kimura et al. | |
| 2016/0321010 A1 | 11/2016 | Hashimoto | |
| 2017/0116131 A1 | 4/2017 | Lin | |
| 2017/0123971 A1 | 5/2017 | Kanaujia et al. | |
| 2017/0139823 A1 | 5/2017 | Tomlin et al. | |
| 2017/0139837 A1 | 5/2017 | Tomlin | |
| 2017/0139838 A1 | 5/2017 | Tomlin | |
| 2017/0255389 A1 | 9/2017 | Tan | |
| 2017/0262175 A1 | 9/2017 | Kanno | |
| 2017/0262365 A1 | 9/2017 | Kanno | |
| 2018/0173619 A1* | 6/2018 | Sivasankaran | G06F 3/0679 |
| 2019/0079859 A1 | 3/2019 | Li et al. | |
| 2019/0087089 A1 | 3/2019 | Yoshida et al. | |
| 2019/0129838 A1* | 5/2019 | Yoshida | G06F 3/06 |

FOREIGN PATENT DOCUMENTS

| | | |
|---|---|---|
| JP | 2016-181058 A | 10/2016 |
| JP | 2017-162065 A | 9/2017 |
| JP | 2019-57155 A | 4/2019 |
| TW | 2014-03318 A | 1/2014 |
| TW | 20150723 A | 3/2015 |
| TW | 201723816 A | 7/2017 |
| TW | 201732821 A | 9/2017 |

OTHER PUBLICATIONS

Jian Huang et al., "FlashBlox: Achieving Both Performance Isolation and Uniform Lifetime for Virtualized SSDs," 15th USENIX Conference on File and Storage Technologies (FAST '17), Feb. 27-Mar. 2, 2017, pp. 375-390.

"Information technology—ATA/ATAPI Command Set—3 (ACS-3," Revision 5, Working Draft Project American National Standard, Oct. 28, 2013, pp. 1-554.

* cited by examiner

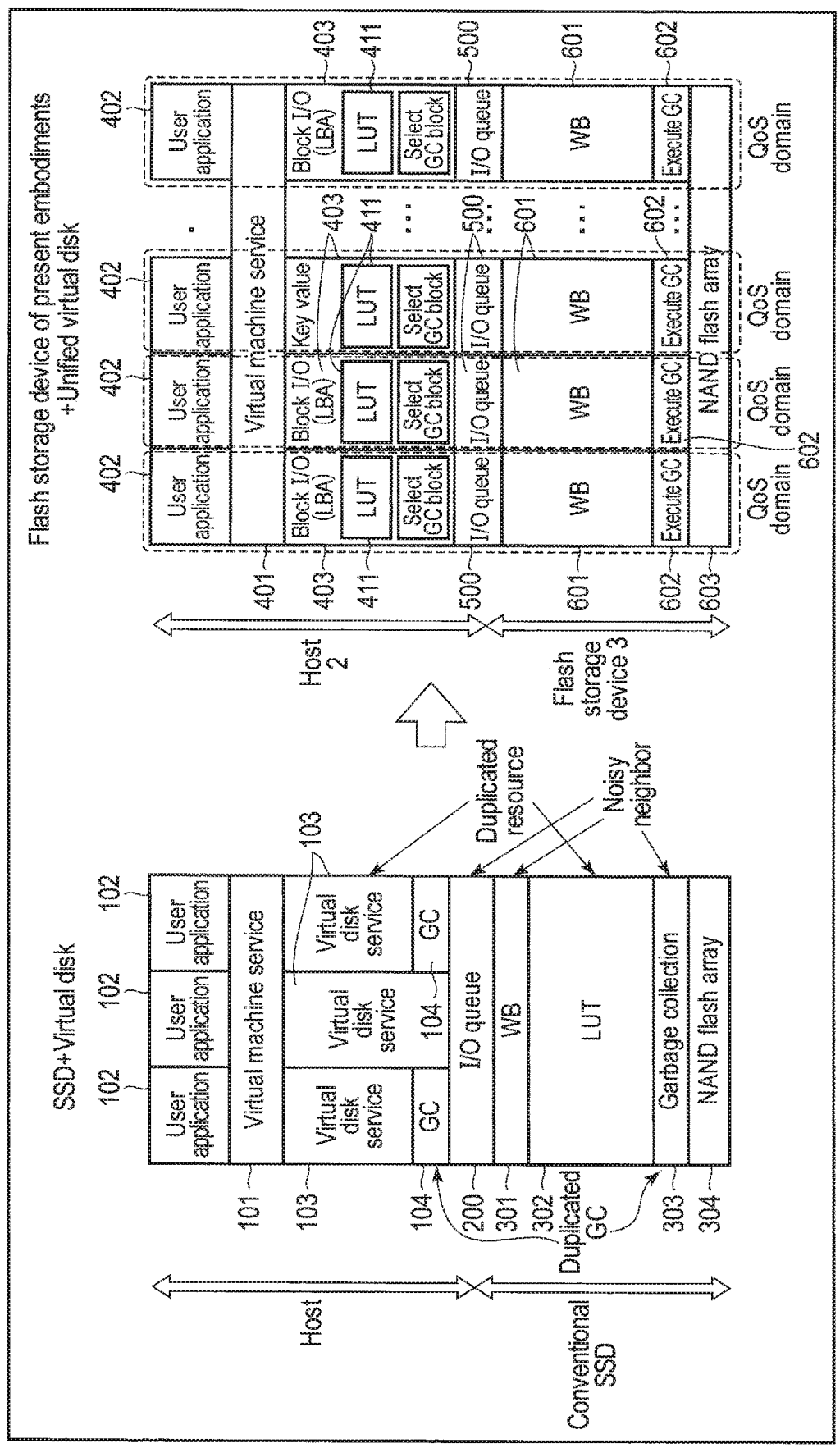
F I G. 2

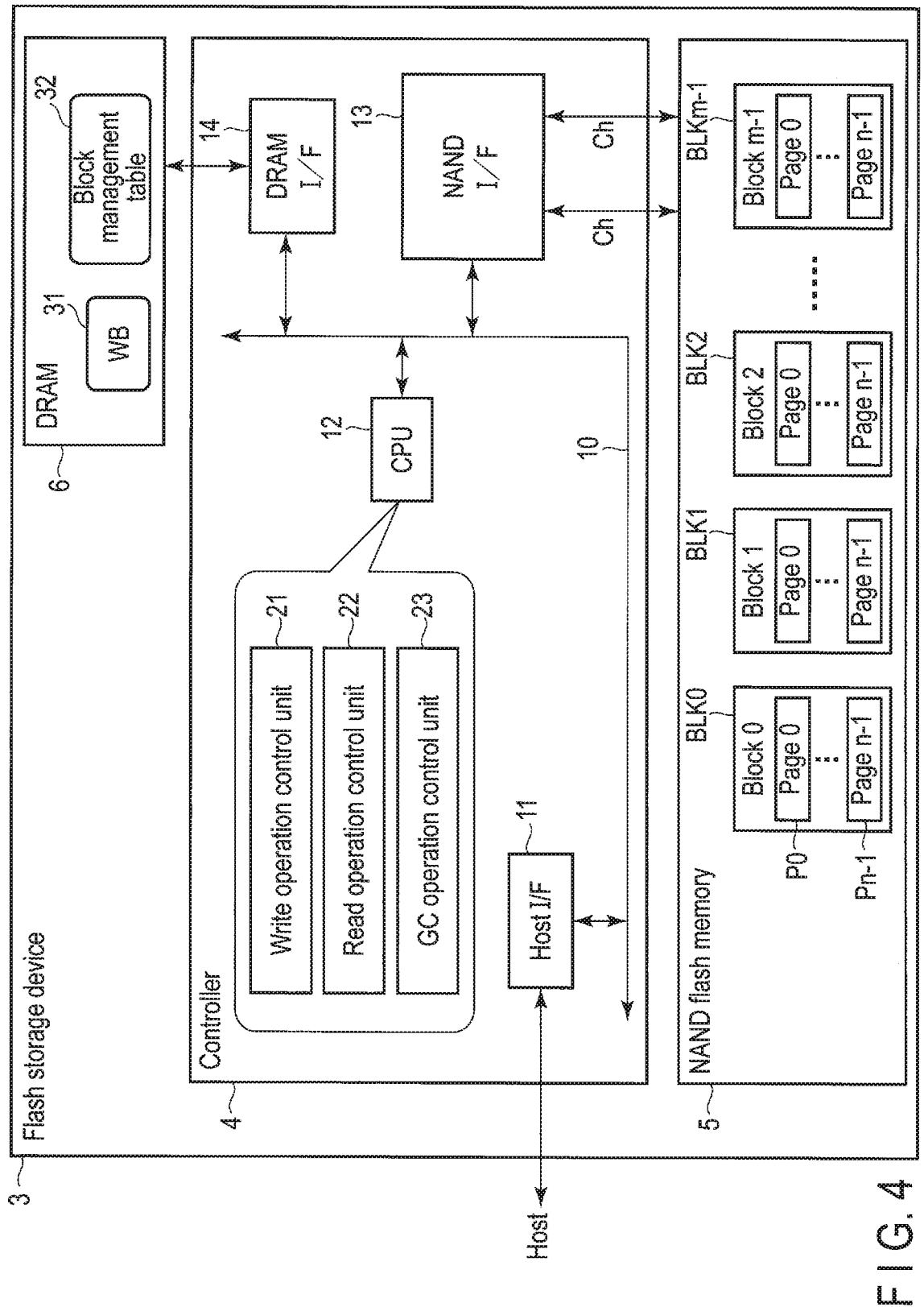
F I G. 4

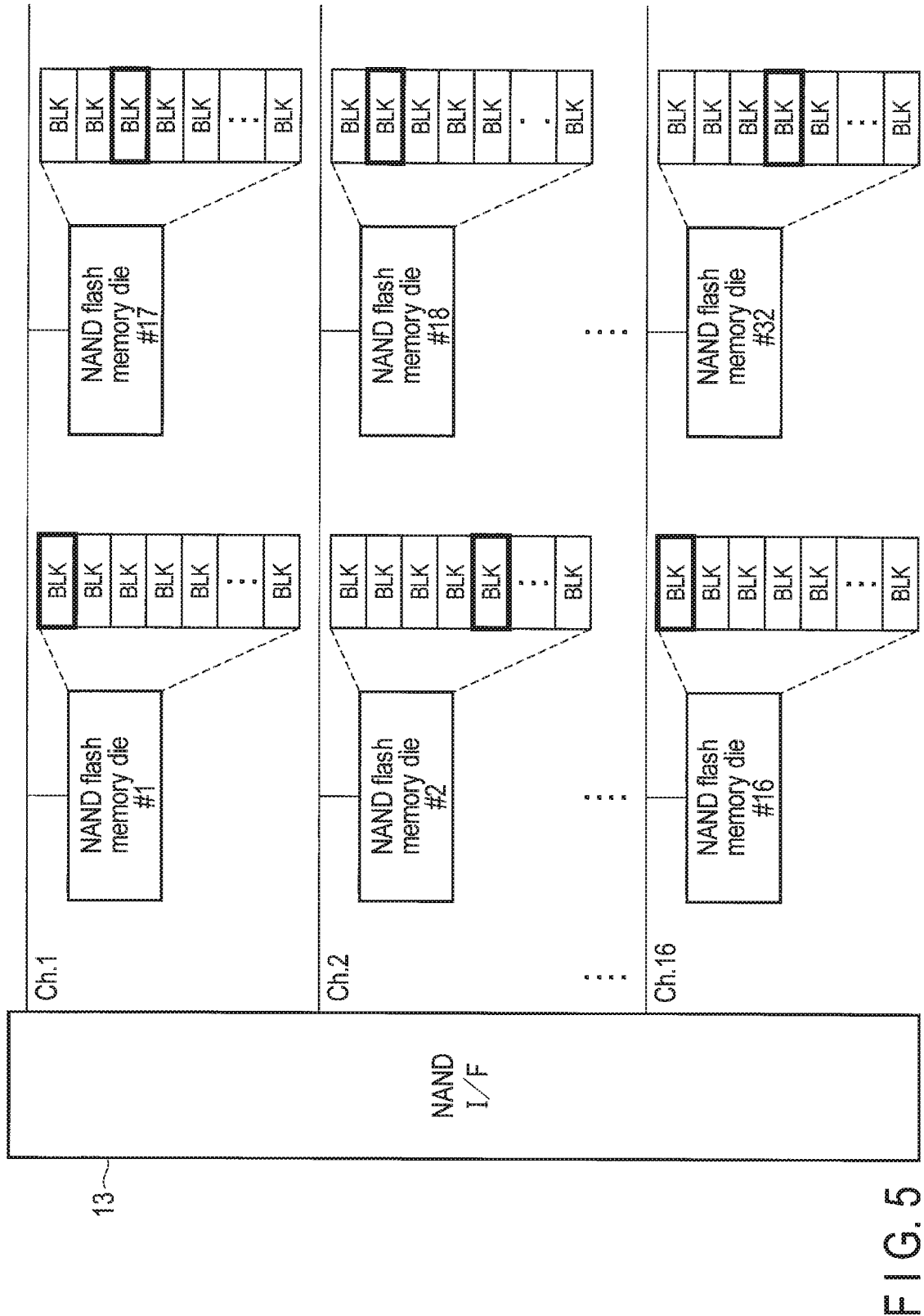
F I G. 5

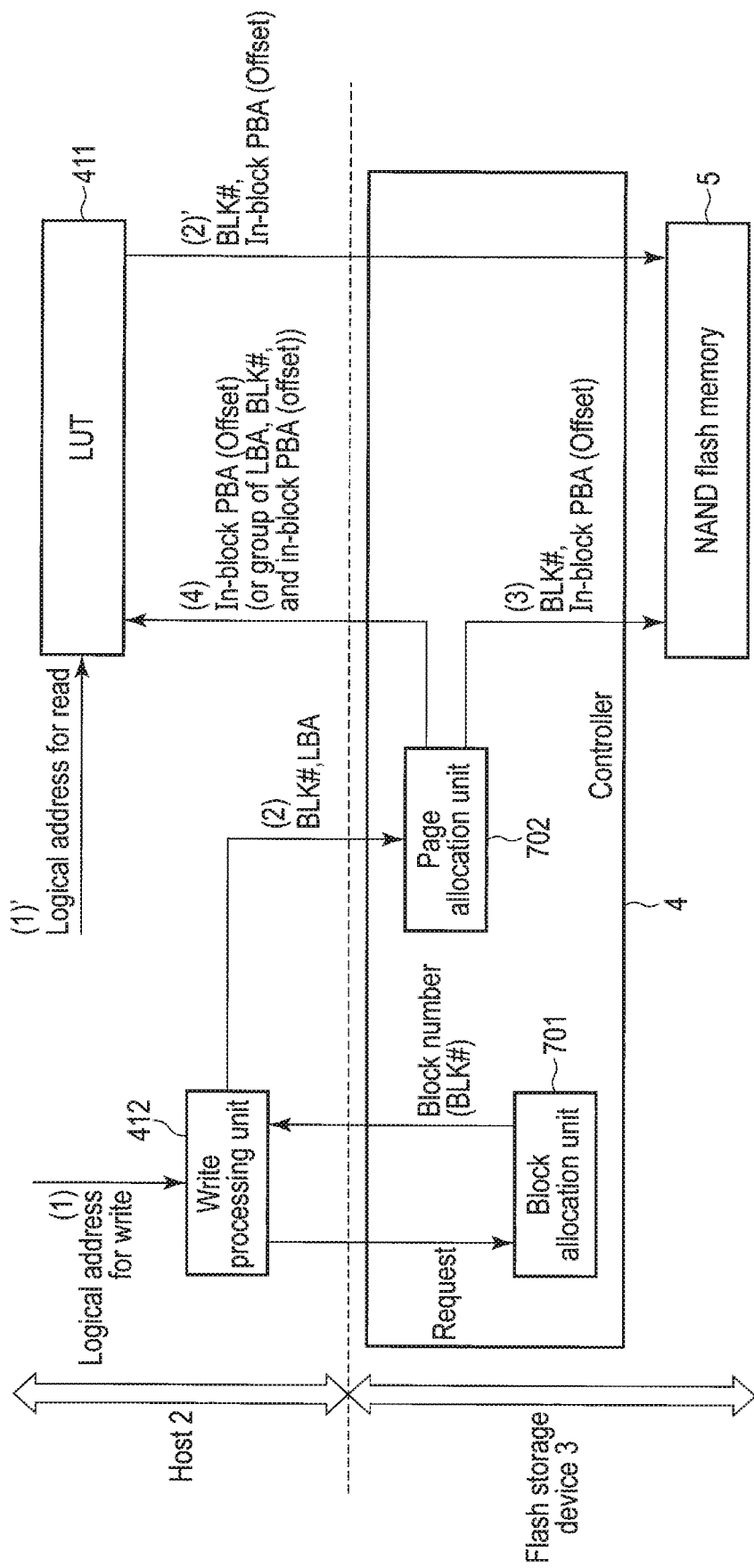

Write command

|  | Description |
|---|---|
| Command ID | Command ID for write command |
| Block number (BLK#) | Physical address designating block to which data should be written |
| Logical address | Logical address is indicative of first logical location to which data should be written |
| Length | Size of data to be written |

F I G. 8

Response to write command

|  | Description |
|---|---|
| In-Block Physical address | In-Block Physical address is indicative of location in block to which data is written.<br>In-block physical address can be designated by in-block offset. |
| Length | Length of data written<br>(data length can be designated by number of grains) |

F I G. 9

Trim command (physical address can be designated)

|  | Description |
|---|---|
| Command ID | Command ID for Trim command |
| Physical address | Physical address is indicative of first physical storage location in which data to be invalidated is stored.<br>Physical address can be designated by block number and offset. |
| Length | Length of data to be invalidated<br>(data length can be designated by number of grains) |

F I G. 10

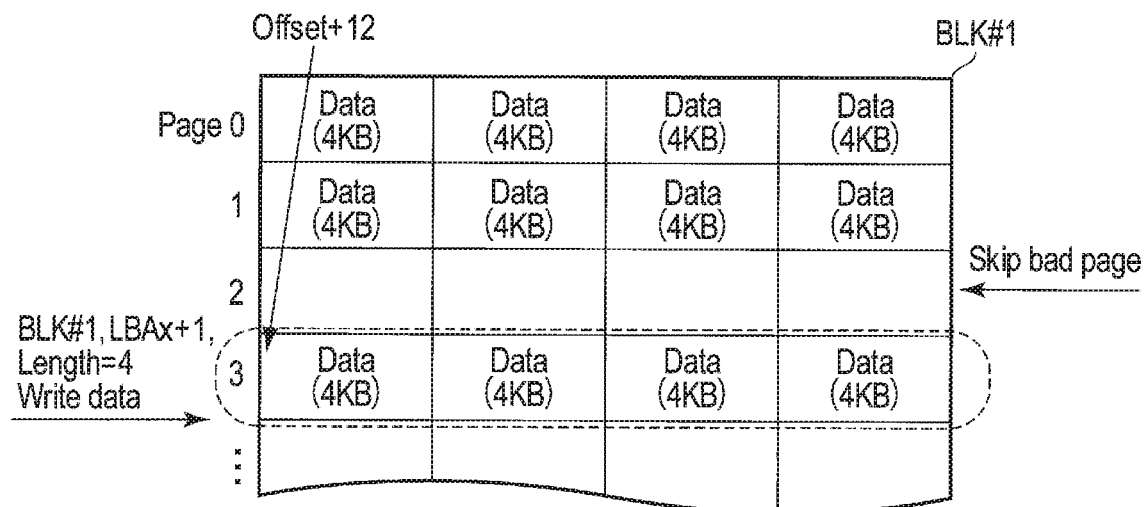
F I G. 13
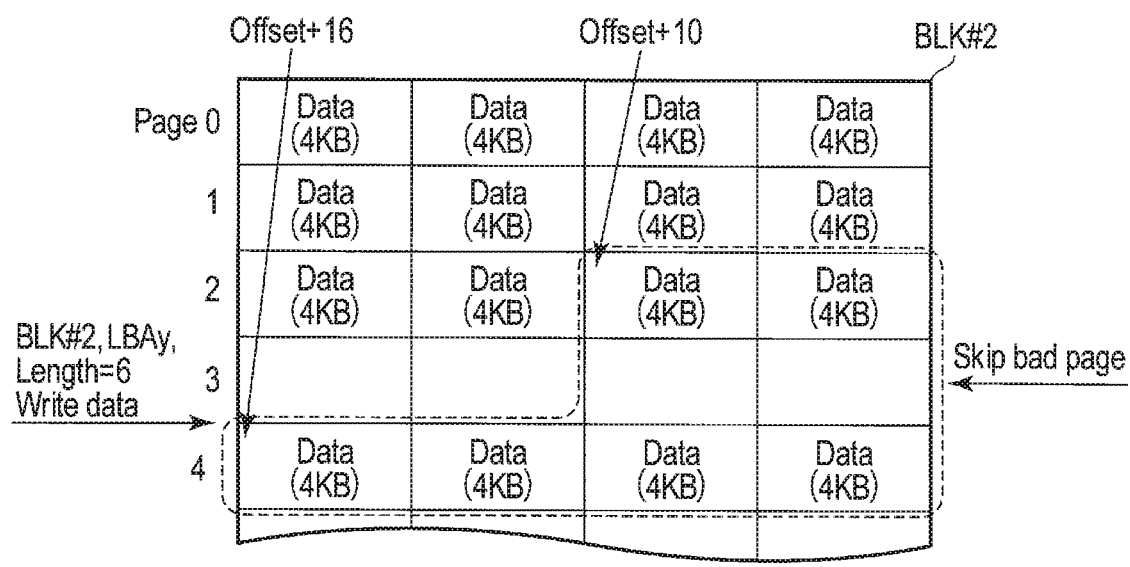
F I G. 14

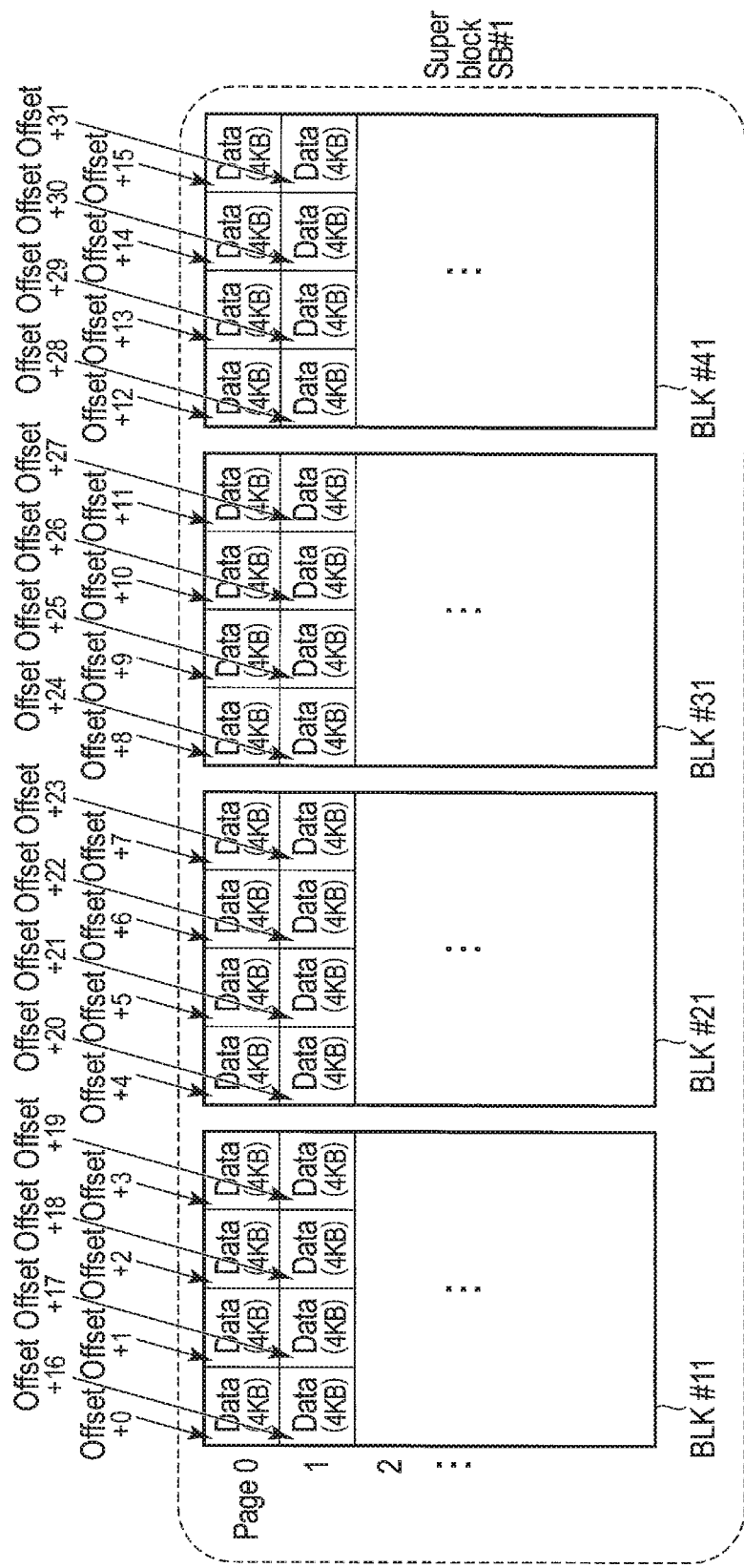
F I G. 17

Maximum block number get command

|  | Description |
|---|---|
| Command ID | Command ID for maximum block number get |
| No parameters | |

F I G. 18

Response to Maximum block number get command

|  | Description |
|---|---|
| Maximum block number | Maximum block number is indicative of maximum value of in-device block number (i.e., number of available blocks existing in device) |

F I G. 19

Block size get command

|  | Description |
|---|---|
| Command ID | Command ID for block size get |
| (Optional) Block number | |

F I G. 20

Response to Block size get command

|  | Description |
|---|---|
| Block size | If block number is designated, device returns size of block corresponding to designated block number to host |

FIG. 21

Block allocate command

|  | Description |
|---|---|
| Command ID | Command ID for block allocate |
|  | Host requests host to allocate free block, and can thereby obtain block number from device |

FIG. 22

Response to Block allocate command

|  | Description |
|---|---|
| Block number | Device selects block to be allocated to host, from free block list, and returns block number of selected block to host |

FIG. 23

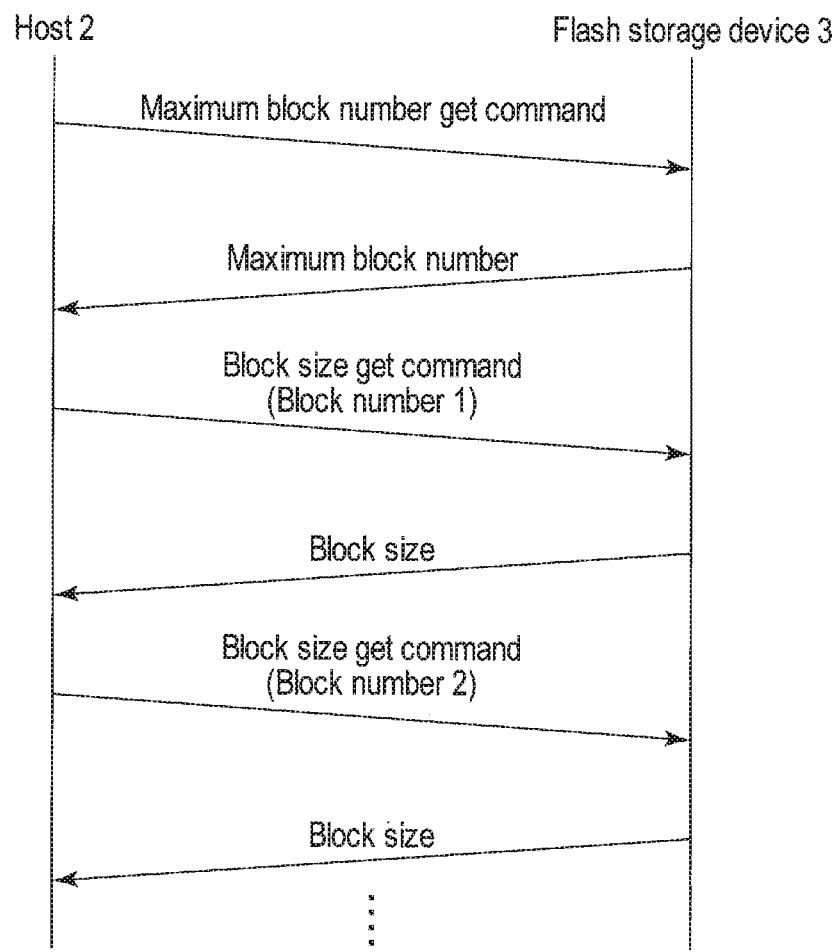
F I G. 24

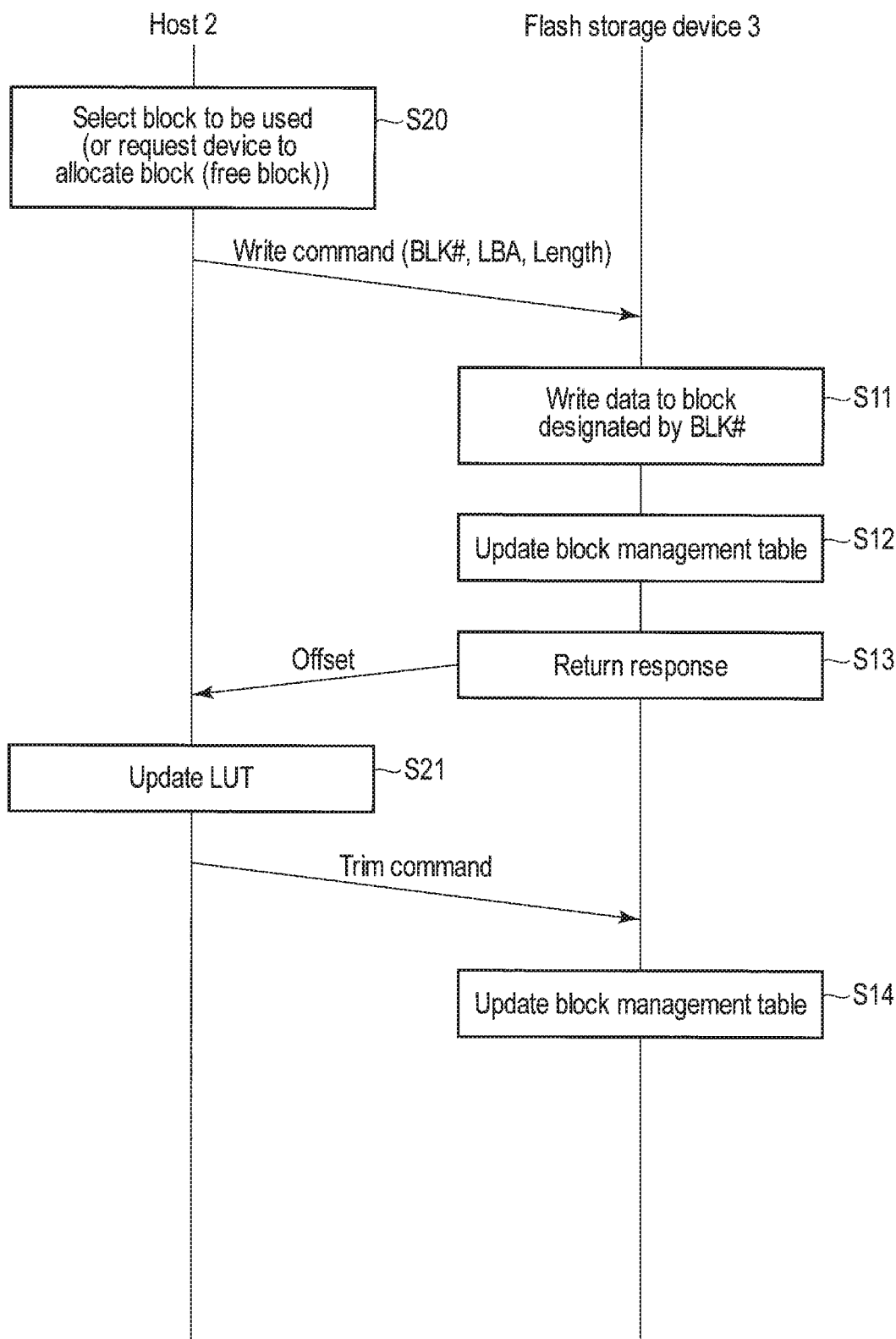
F I G. 25

Read command

| | Description |
|---|---|
| Command ID | Command ID for read command |
| Physical address (PBA) #1 | Physical address is indicative of first physical storage location from which data should be read.<br>Physical address can be designated by block number and offset |
| Length #1 | Length of data to be read<br>(data length can be designated by number of grains) |
| Physical address (PBA) #2 | Physical address is indicative of first physical location from which data should be read.<br>Physical address can be designated by block number and offset |
| Length#2 | Length of data to be read<br>(data length can be designated by number of grains) |
| Transfer destination pointer | Location in host memory to which read data should be transferred |

F I G. 30

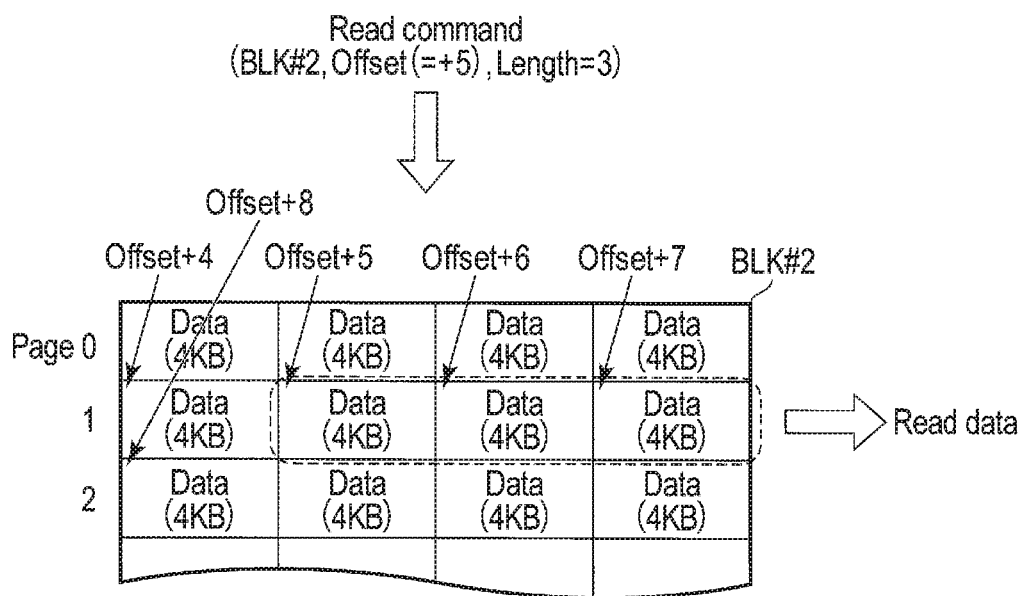

F I G. 31

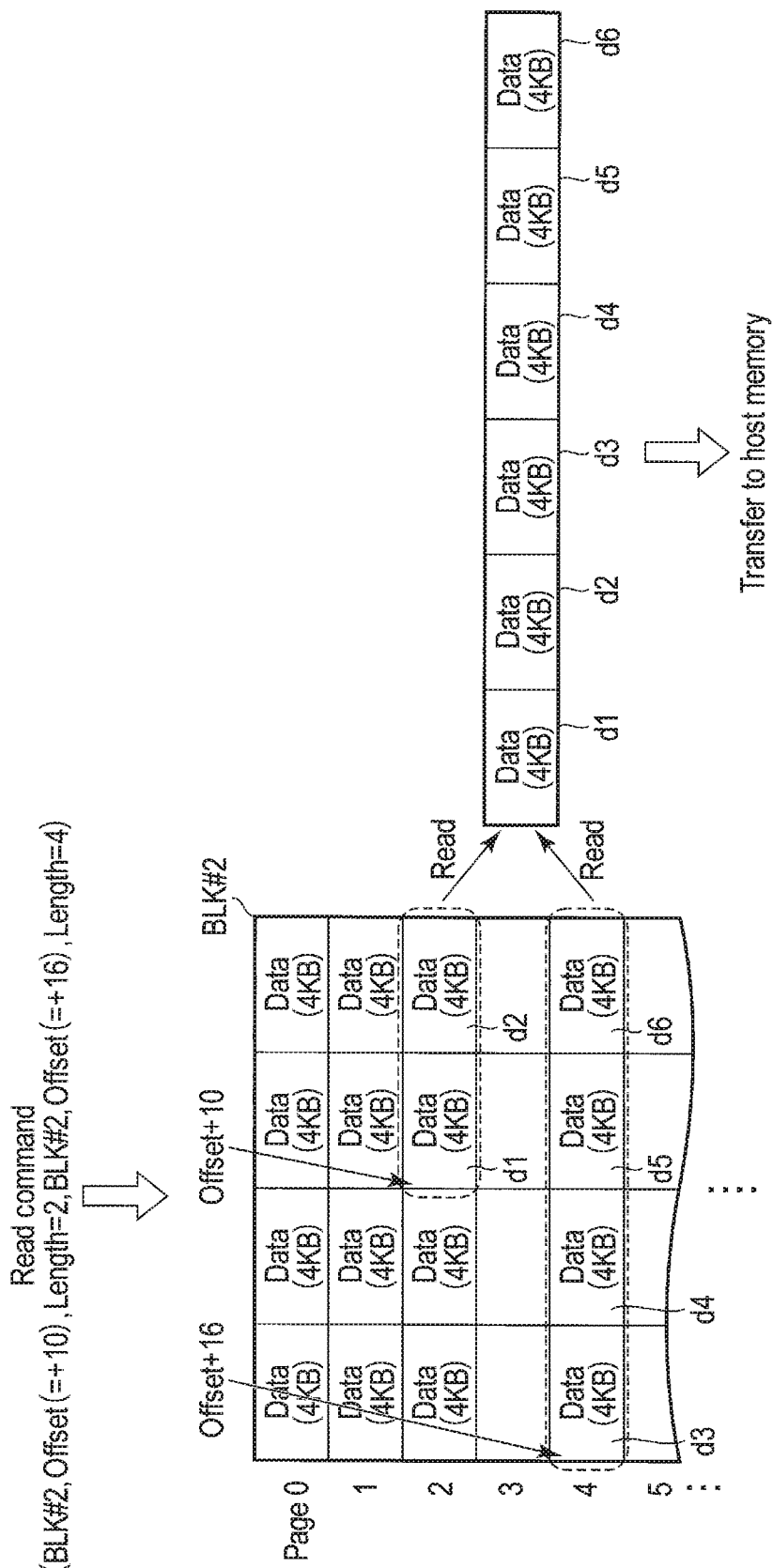
F I G. 32

GC control command

|  | Description |
|---|---|
| Command ID | Command ID for GC control |
| GC source block number (BLK#) | Host can designate which block should be GC source block. Host can designate plural GC source block numbers. |
| GC destination block number(BLK#) | Host can designate which block should be GC destination block. Host can designate plural GC destination block numbers. |

Callback command for GC

| | Description |
|---|---|
| Command ID | Command ID for GC callback |
| Logical address | Logical address of copied valid data |
| Length | Length of copied valid data |
| Destination physical address | Destination physical address is indicative of location in GC destination block to which valid data is copied. Destination physical address can be designated by block number and offset. |

F I G. 35

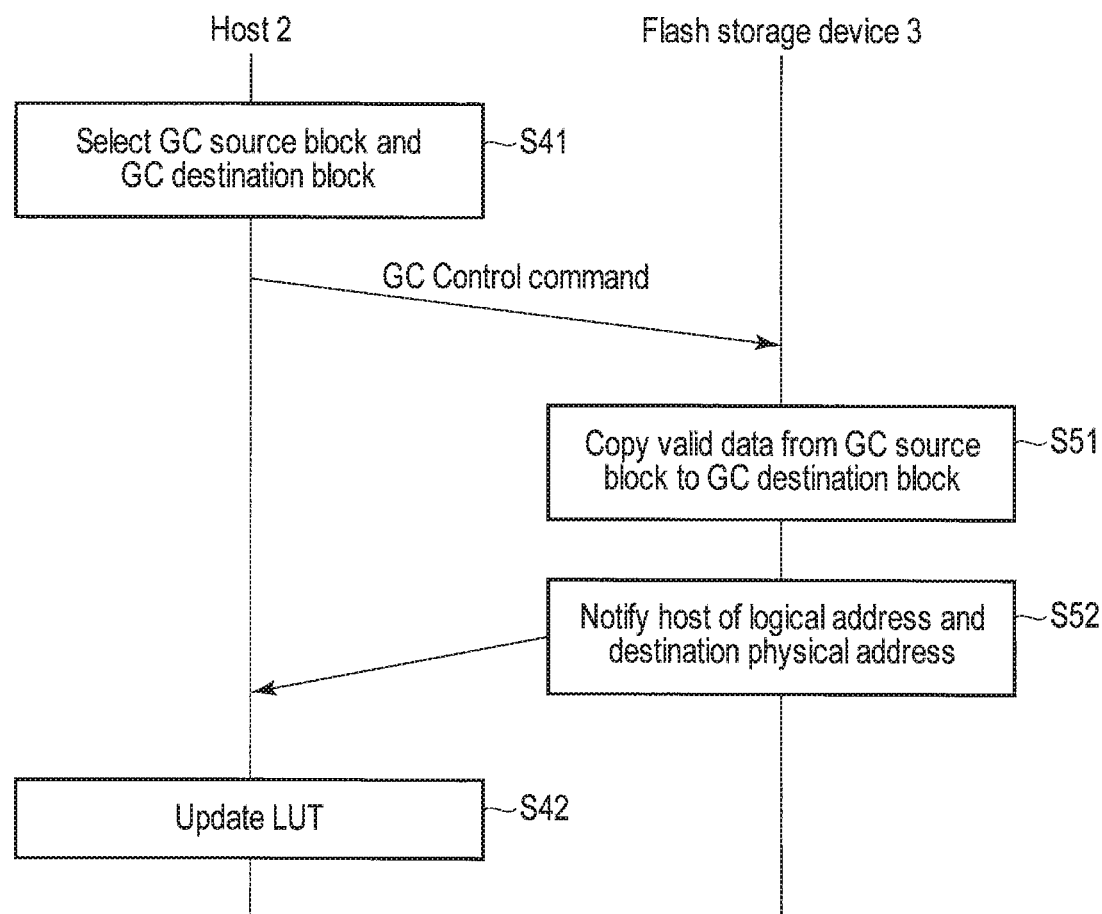

F I G. 36

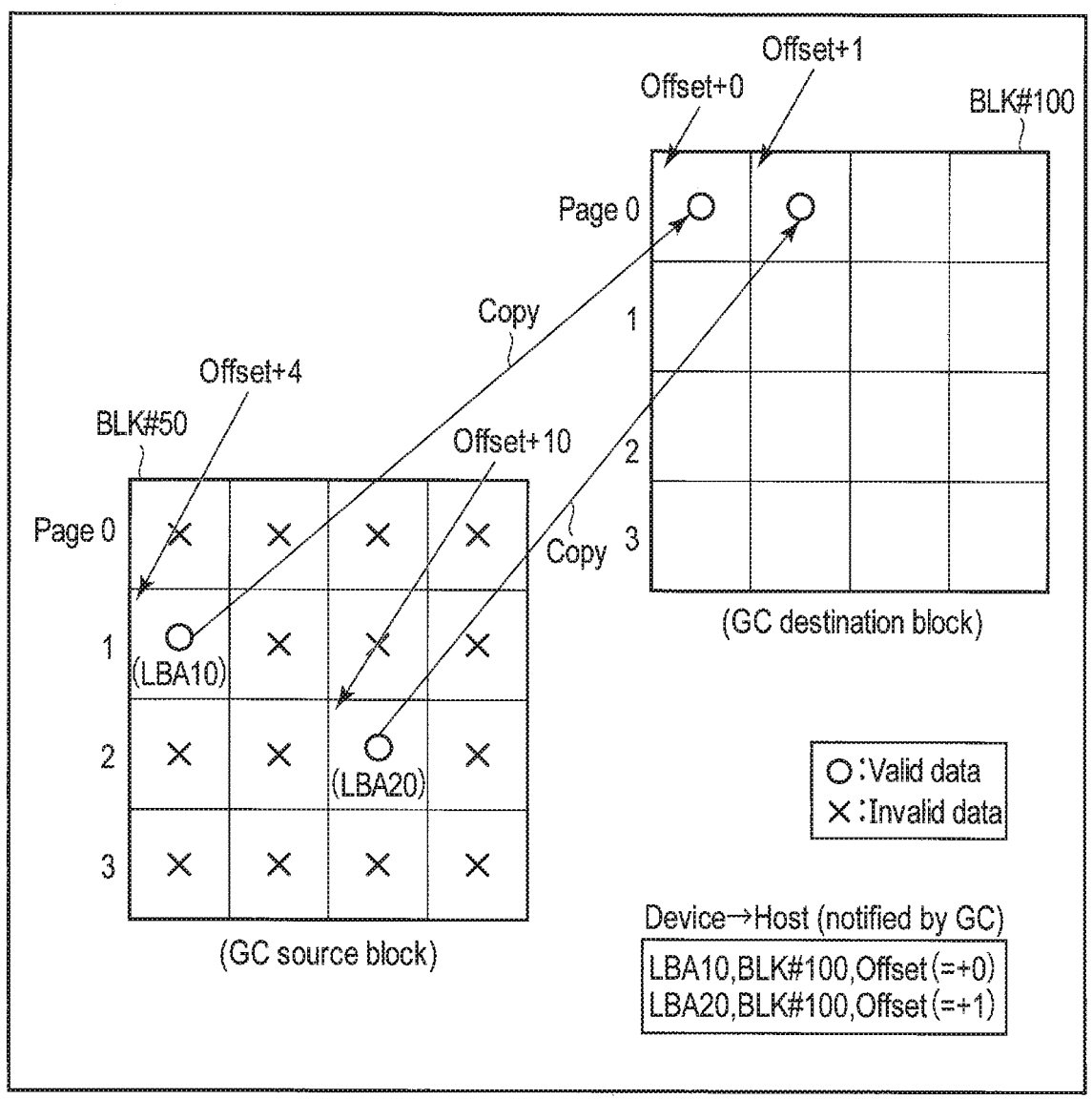
F I G. 37

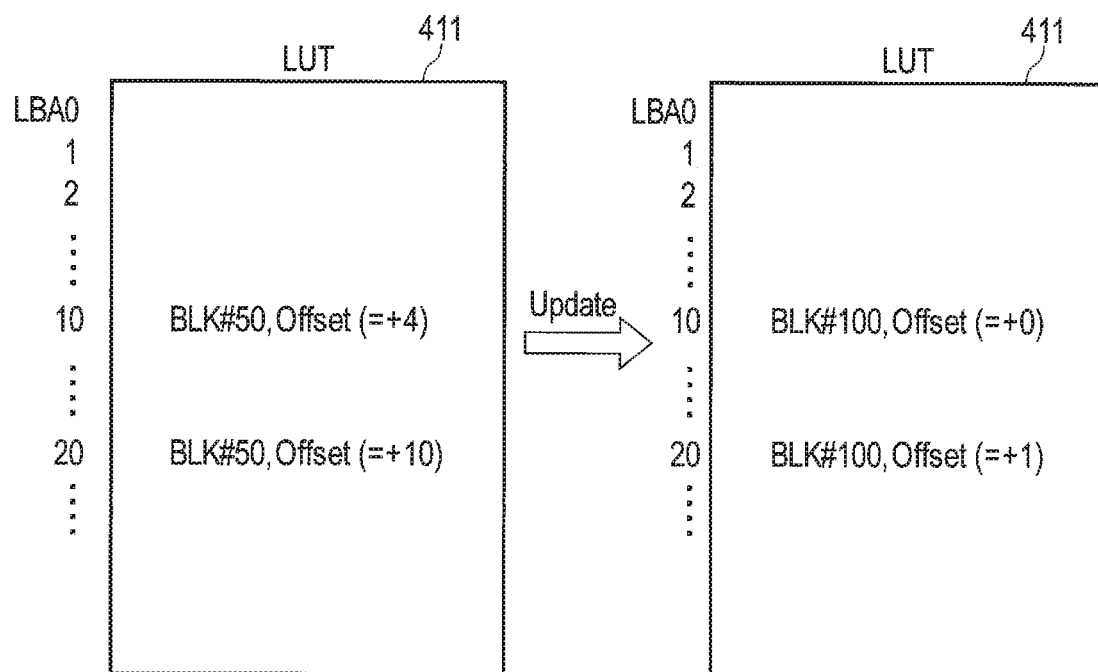
F I G. 38

MEMORY SYSTEM AND METHOD FOR CONTROLLING NONVOLATILE MEMORY

CROSS-REFERENCE TO RELATED APPLICATIONS

This application is a continuation of application Ser. No. 16/899,805 filed Jun. 12, 2020, which is a continuation of application Ser. No. 15/984,944 filed May 21, 2018 and is based upon and claims the benefit of priority from Japanese Patent Application No. 2017-208105, filed Oct. 27, 2017, the entire contents of which are incorporated herein by reference.

FIELD

Embodiments described herein relate generally to a technology of controlling a nonvolatile memory.

BACKGROUND

In recent years, memory systems comprising nonvolatile memories have been widely prevalent.

As such a memory system, a solid state drive (SSD) based on a NAND flash technology is known.

A new interface between a host and a storage has been recently proposed.

In general, however, since control of a NAND flash memory is complicated, appropriate role sharing between a host and a storage (memory system) is required to be considered for implementation of the new interface to improve the I/O performance.

BRIEF DESCRIPTION OF THE DRAWINGS

FIG. 2 is a block diagram for explanation of role sharing between conventional SSD and a host, and role sharing between the flash storage device according to the embodiments and the host.

FIG. 4 is a block diagram showing a configuration example of the memory system according to the embodiments.

FIG. 5 is a block diagram showing a relationship between a NAND interface and plural NAND flash memory dies provided in the memory system according to the embodiments.

FIG. 7 is a block diagram for explanation of a data write operation of designating the logical address and the block number by the host and determining an in-block physical address (in-block offset) by the memory system according to the embodiments, and a data read operation of designating the block number and the in-block physical address (in-block offset) by the host.

FIG. 8 is a table for explanation of the write command applied to the memory system according to the embodiments.

FIG. 9 is a table for explanation of a response to the write command shown in FIG. 8.

FIG. 10 is a table for explanation of a Trim command applied to the memory system according to the embodiments.

FIG. 13 is a block diagram for explanation of a write operation which skips a defective page.

FIG. 14 is a block diagram for explanation of another example of the write operation which skips a defective page.

FIG. 17 is a block diagram for explanation of a relationship between a block number and offsets in a case where a super block is used.

FIG. 18 is a table for explanation of a maximum block number get command applied to the memory system according to the embodiments.

FIG. 19 is a table for explanation of a response to the maximum block number get command.

FIG. 20 is a table for explanation of a block size get command applied to the memory system according to the embodiments.

FIG. 21 is a table for explanation of a response to the block size get command.

FIG. 22 is a table for explanation of a block allocate command (block allocate request) applied to the memory system according to the embodiments.

FIG. 23 is a table for explanation of a response to the block allocate command.

FIG. 24 is a sequence chart showing block information acquisition processing executed by the host and the memory system according to the embodiments.

FIG. 25 is a sequence chart showing a sequence of write processing executed by the host and the memory system according to the embodiments.

FIG. 30 is a table for explanation of the read command applied to the memory system according to the embodiments.

FIG. 31 is a table for explanation of the read operation executed by the memory system according to the embodiments.

FIG. 32 is a diagram for explanation of an operation of reading data portions stored in respective different physical storage locations in response to the read command from the host.

FIG. 35 is a table for explanation of a callback command for GC applied to the memory system according to the embodiments.

FIG. 36 is a sequence chart showing a sequence of a garbage collection (GC) operation executed by the host and the memory system according to the embodiments.

FIG. 37 is a diagram for explanation of an example of a data copy operation executed for the garbage collection (GC).

FIG. 38 is an illustration for explanation of contents of a lookup table of the host updated based on a result of the data copy operation shown in FIG. 37.

DETAILED DESCRIPTION

Figure 1:
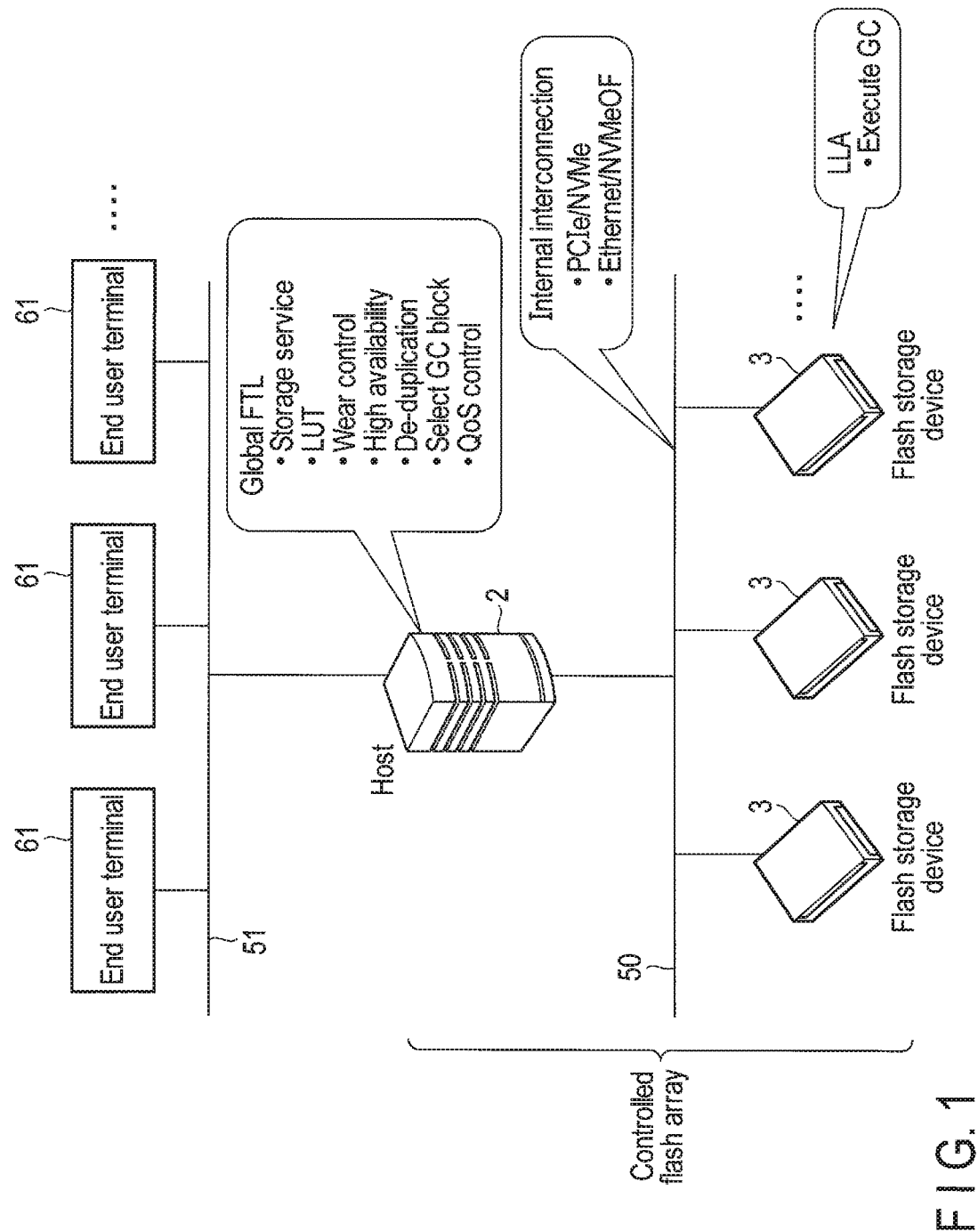
FIG. 1 is a block diagram showing a relationship between a host and a memory system (flash storage device) according to the embodiments.

Various embodiments will be described hereinafter with reference to the accompanying drawings.

In general, according to one embodiment, a memory system connectable to a host, comprises a nonvolatile memory including plural blocks each including plural pages, and a controller electrically connected to the nonvolatile memory and configured to control the nonvolatile memory.

When receiving a write request designating a first logical address and a first block number from the host, the controller determines a first location in a first block having the first block number to which data from the host should be written, writes the data from the host to the first location in the first block, and notifies the host of either an in-block physical address indicative of the first location, or a group of the first logical address, the first block number and the first in-block physical address.

When receiving from the host a control command designating a copy source block number and a copy destination block number for garbage collection of the nonvolatile memory, the controller selects a second block having the copy source block number and a third block having the copy destination block number, from the plural blocks, determines a copy destination location in the third block to which valid data stored in the second block should be written, copies the valid data to the copy destination location in the third block, and notifies the host of a logical address of the valid data, the copy destination block number, and a second in-block physical address indicative of the copy destination location.

First, a configuration of a computing system including a memory system according to one of the embodiments will be described with reference to FIG. 1.

The memory system is a semiconductor storage device configured to write data to a nonvolatile memory and to read data from the nonvolatile memory. The memory system is implemented as a flash storage device 3 based on the NAND flash technology.

The computing system may include a host (host device) 2 and plural flash storage devices 3. The host 2 may be a server configured to use a flash array composed of plural flash storage devices 3 as a storage. The host (server) 2 and the flash storage devices 3 are interconnected via an interface 50 (internal interconnection). The interface 50 for the internal interconnection is not limited to this, but PCI Express (PCIe) (registered trademark), NVM Express (NVMe) (registered trademark), Ethernet (registered trademark), NVMe over Fabrics (NVMeOF), and the like can be used as the interface.

A typical example of a server which functions as the host 2 is a server in a data center.

In a case where the host 2 is implemented by the server in the data center, the host (server) 2 may be connected to plural end user terminals (clients) 61 via a network 51. The host 2 can provide various services to the end user terminals 61.

Examples of services which can be provided by the host (server) 2 are (1) Platform as a Service (PaaS) which provides a system running platform to each of the clients (each of the end user terminals 61), (2) Infrastructure as a Service (IaaS) which provides an infrastructure such as a virtual server to each of the clients (each of the end user terminals 61), and the like.

Plural virtual machines may be run on a physical server which functions as the host (server) 2. Each of the virtual machines running on the host (server) 2 can function as a virtual server configured to provide various services to several corresponding clients (end user terminals 61).

The host (server) 2 comprises a storage management function of managing plural flash storage devices 3 constituting a flash array, and a front-end function of providing various services including the storage access to each of the end user terminals 61.

In the conventional SSD, a block/page hierarchical structure of a NAND flash memory is concealed by a flash translation layer (FTL) in SSD. In other words, FTL of the conventional SSD comprises (1) a function of managing mapping between each of the logic addresses and each of the physical addresses of the NAND flash memory, by using a lookup table which functions as a logical-to-physical address translation table, (2) a function of concealing read/write in page units and the erase operation in block units, (3) a function of performing garbage collection (GC) of the NAND flash memory, and the like. Mapping between each of the logical addresses and each of physical addresses of the NAND flash memory cannot be seen from the host. The block/page structure of the NAND flash memory cannot be seen from the host, either.

A type of address translation (application-level address translation) is often executed in the host, too. This address translation manages mapping between each of the application-level logical addresses and each of the logical addresses for SSD, using the application-level address translation table. In addition, in the host, too, a type of GC (application-level GC) for change of data placement in the logical address space is executed for cancellation of a fragment which occurs in the logical address space for SSD.

In a redundant configuration in which each of the host and SSD includes the address translation table (in which SSD includes the lookup table functioning as the logical-to-physical address translation table while the host includes the application-level address translation table), however, enormous volumes of memory resources are consumed to hold these address translation tables. Furthermore, duplex address translation including the address translation on the host side and the address translation on the SSD side is also a factor which degrades the I/O performance.

Furthermore, the application-level GC on the host side becomes a factor which increases the amount of data written to SSD to a multiple (for example, double) of actual user data amount. Such increase of the data write amount degrades the storage performance of the entire system and shortens the life of SSD in combined with write amplification of SSD.

A measure of moving all the functions of FTL of the conventional SSD to the host is considered in order to solve this problem.

To take this measure, however, the host needs to directly handle blocks and pages of the NAND flash memory. In the NAND flash memory, the host can hardly execute handling due to restrictions on page write order. In addition, the block may often include a defective page (bad page) in the NAND flash memory. Handling the bad page is further difficult for the host.

Thus, in the present embodiments, the role of FTL is shared by the host 2 and the flash storage device 3. Generally speaking, the host 2 manages the lookup table which functions as the logical-to-physical address translation table, but the host 2 designates a block number of a block to which the data should be written and a logical address corresponding to the data, alone, and a location in the block to which the data should be written (i.e., a write destination location) is determined by the flash storage device 3. The flash storage device 3 notifies the host 2 of an in-block physical address indicative of the determined location in the block (write destination location).

Thus, the host 2 handles the block alone, and the location in the block (for example, page or location in the page) is handled by the flash storage device 3.

When the host 2 needs to write data to the flash storage device 3, the host 2 selects the block number (or requests the flash storage device 3 to allocate the free block), and transmits to the flash storage device 3 a write request (write command) designating both the logical address and the block number of the selected block (or the block number of the allocated block of which the flash storage device 3 notifies the host 2). The flash storage device 3 writes the data from the host 2 to the block having the designated block number. In this case, the flash storage device 3 determines the location in the block (write destination location) and writes the data from the host 2 to the location in the block (write destination location). The flash storage device 3 notifies the host 2 of the in-block physical address indicative of the location in the block (write destination location) as a response (return value) to the write request. The FTL function moved to the host 2 is hereinafter called global FTL.

The global FTL of the host 2 comprises a function of executing a storage service, a wear control function, a function of implementing high availability, a de-duplication function of preventing plural duplicated data parts having the same contents from being stored in a storage, a garbage collection (GC) block selection function, a QoS control function, and the like. The QoS control function includes a function of determining the access unit for each QoS domain (or each block). The access unit is indicative of the minimum data size (grain) which the host 2 can write/read. The flash storage device 3 supports a single access unit (grain) or plural access units (grains) and, if the flash storage device 3 supports the access units, the host 2 can instruct the access units which should be used for each QoS domain (or each block) to the flash storage device 3.

In addition, the QoS control function includes a function of preventing as much performance interference between the QoS domains as possible. This function is basically a function of maintaining stable latency.

In contrast, the flash storage device 3 can execute low-level abstraction (LLA). LLA is a function for abstraction of the NAND flash memory. LLA includes a function of concealing a defective page (bad page) and a function of securing the restrictions on page write order. LLA also includes a GC execution function. The GC execution function copies the valid data in the copy source block (GC source block) designated by the host 2 to the copy destination block (GC destination block) designated by the host 2. The GC execution function of the flash storage device 3 determines a location (copy destination location) in the GC destination block to which the valid data should be written, and copies the valid data in the GC source block to the copy destination location in the GC destination block.

FIG. 2 shows role sharing between the host and the conventional SSD, and role sharing between the host 2 and the flash storage device 3 according to the present embodiments.

The left part of FIG. 2 shows a hierarchical structure of the entire computing system including the conventional SSD and the host executing virtual disk services.

In the host (server), a virtual machine service 101 for providing plural virtual machines to plural end users is executed. In each of the virtual machines on the virtual machine service 101, an operating system and user applications 102 used by the corresponding end users are executed.

In addition, in the host (server), plural virtual disk services 103 corresponding to the user applications 102 are executed. Each of the virtual disk services 103 allocates a part of the capacity of the storage resource in the conventional SSD as the storage resource (virtual disk) for the corresponding user application 102. In each of the virtual disk services 103, application-level address translation which translates the application-level logical address into the logical address for SSD is also executed by using the application-level address translation table. Furthermore, in the host, application-level GC 104 is also executed.

Transmission of the command from the host (server) to the conventional SSD and return of a response of command completion from the conventional SSD to the host (server) are executed via an I/O queue 200 which exists in each of the host (server) and the conventional SSD.

The conventional SSD comprises a write buffer (WB) 301, a lookup table (LUT) 302, a garbage collection function 303, and a NAND flash memory (NAND flash array) 304. The conventional SSD manages only one lookup table (LUT) 302, and resources of the NAND flash memory (NAND flash array) 304 are shared by the virtual disk services 103.

In this configuration, write amplification becomes large by duplicated GC including the application-level GC 104 under the virtual disk services 103 and the garbage collection function 303 (LUT-level GC) in the conventional SSD. In addition, in the conventional SSD, the noisy neighbor issue that the frequency of GC increases by the increase in data write amount from a certain end user or a certain virtual disk service 103 and the I/O performance for the other end user or the other virtual disk service 103 is thereby degraded, may occur.

In addition, a number of memory resources are consumed due to the existence of duplicated resources including the application-level address translation table in each virtual disk service and the LUT 302 in the conventional SSD.

The right part of FIG. 2 shows a hierarchical structure of the entire computing system including the host 2 and the flash storage device 3 according to the present embodiments.

In the host (server) 2, a virtual machine service 401 for providing plural virtual machines to plural end users is executed. In each of the virtual machines on the virtual machine service 401, an operating system and user applications 402 used by the corresponding end users are executed.

In addition, in the host (server) 2, plural I/O services 403 corresponding to user applications 402 are executed. The I/O services 403 may include LBA-based block I/O service, key-value store service, and the like. Each of the I/O services 403 includes a lookup table (LUT) 411 which manages mapping between each of the logical addresses and each of the physical addresses of the flash storage device 3. The logical address is indicative of an identifier which can identify data to be accessed. The logical address may be the logical block address (LBA) which designates a location in the logical address space, a key (tag) of the key-value store or a hash value of the key.

In the LBA-based block I/O service, LUT 411 which manages mapping between each of the logical addresses (LBAs) and each of the physical addresses of the flash storage device 3 may be used.

In the key-value store service, LUT 411 which manages mapping between each of the logical addresses (i.e., tags such as keys) and each of the physical addresses indicative of the physical storage locations in the flash storage device 3 in which the data corresponding to the logical addresses (i.e., tags such as keys) are stored may be used. In the LUT 411, a relationship between the tag, the physical address at which data identified by the tag is stored, and a data length of the data may be managed.

Each of the end users can select an addressing method (LBA, a key of the key-value store, or the like) which should be used.

Each LUT 411 does not translate each of the logical addresses from the user application 402 into each of the logical addresses for the flash storage device 3, but translates each of the logical addresses from the user application 402 into each of the physical addresses of the flash storage device 3. In other words, each LUT 411 is a table in which the table for translating the logical address for the flash storage device 3 into the physical address and the application-level address translation table are integrated (merged).

In addition, each I/O service 403 includes a GC block selection function. The GC block selection function can manage a valid data amount of each block by using the corresponding LUT and can thereby select the GC source block.

In the host (server) 2, the I/O service 403 may exist for each of the QoS domains. The I/O service 403 belonging to a certain QoS domain may manage mapping between each of the logical addresses used by the user application 402 in the corresponding QoS domain and each of the block numbers of the blocks belonging to the resource group allocated to the corresponding QoS domain.

Transmission of the command from the host (server) 2 to the flash storage device 3 and return of a response of command completion or the like from the flash storage device 3 to the host (server) 2 are executed via an I/O queue 500 which exists in each of the host (server) 2 and the flash storage devices 3. The I/O queues 500 may also be classified into plural queue groups corresponding to the QoS domains.

The flash storage device 3 comprises plural write buffers (WB) 601 corresponding to the QoS domains, plural garbage collection (GC) functions 602 corresponding to the QoS domains, and the NAND flash memories (NAND flash array) 603.

In the configuration shown at the right part of FIG. 2, since the upper layer (host 2) can recognize the block boundary, the upper layer can write the user data to each block in consideration of the block boundary/block size. In other words, the host 2 can recognize each of blocks of the NAND flash memory (NAND flash array) 603 and can thereby execute, for example, the control such as simultaneously writing the data to one entire block or invalidating the entire data in one block by erasing (unmapping) or updating. As a result, a situation in which the valid data and the invalid data exist together in one block can be prevented from easily occurring. The frequency at which GC needs to be executed can be therefore reduced. By reducing the frequency of GC, the write amplification can be lowered, the performance of the flash storage device 3 can be improved, and the life of the flash storage device 3 can be maximized. Thus, the configuration that the upper layer (host 2) can recognize the block number is useful.

In contrast, the location in the block to which the data should be written is determined by not the upper layer (host 2), but the flash storage device 3. Therefore, the defective page (bad page) can be concealed and the restrictions on page write order can be secured.

Figure 3:
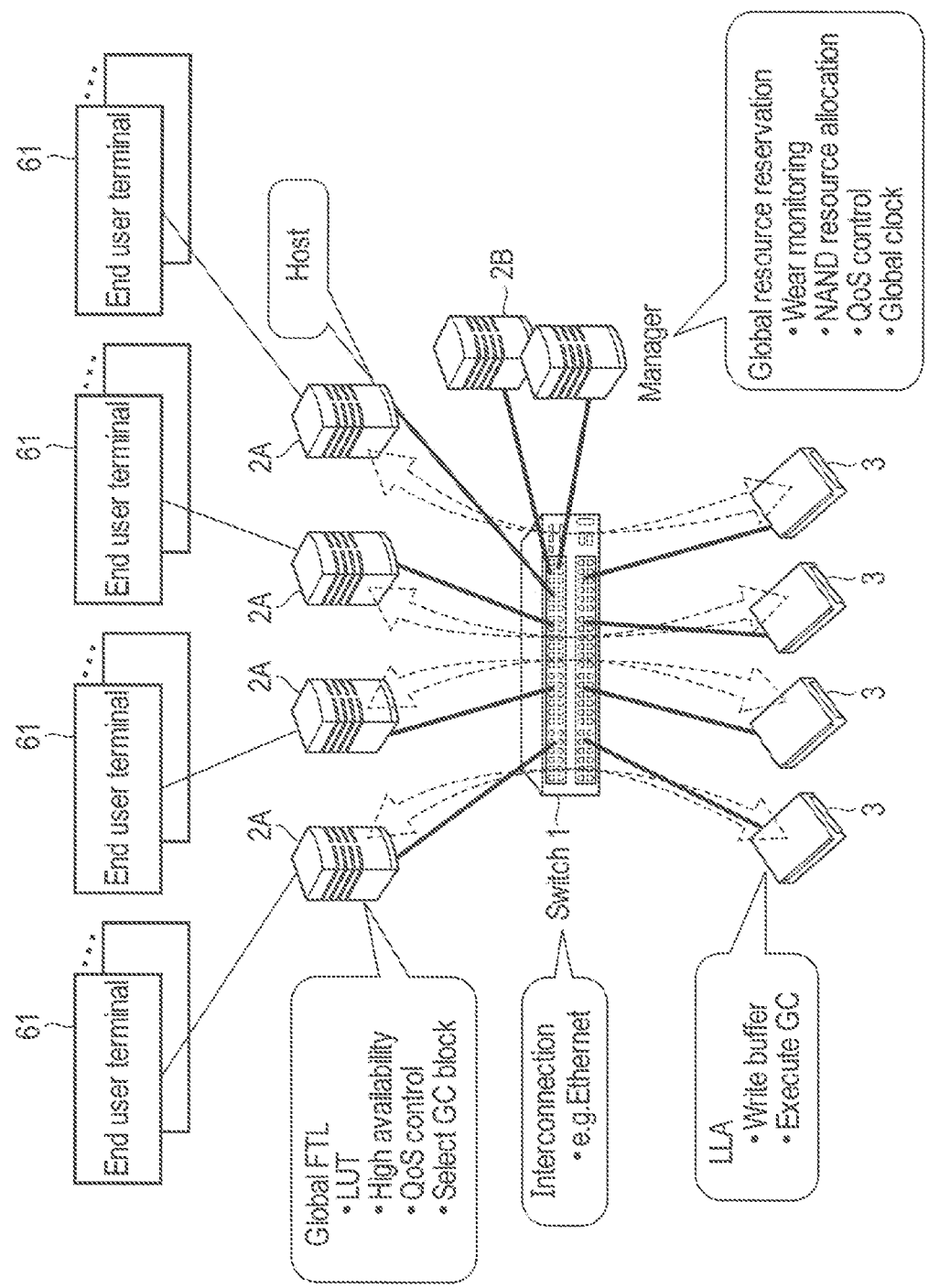
FIG. 3 is a block diagram showing a configuration example of a computing system in which data transfer between plural hosts and plural flash storage devices is executed via a network equipment.

FIG. 3 shows a modified example of the system configuration shown in FIG. 1.

In FIG. 3, data transfer between plural hosts 2A and plural flash storage devices 3 is executed via a network equipment (network switch 1).

In a computing system shown in FIG. 3, the storage management function of the host (server) 2 shown in FIG. 1 is moved to a manager 2B, and the front-end function of the host (server) 2 is moved to the hosts (hosts for end user services) 2A.

The manager 2B manages plural flash storage devices 3, and allocates storage resources of the flash storage devices 3 to each of the hosts (hosts for end user services) 2A in response to a request from each of the hosts (hosts for end user services) 2A.

Each of the hosts (hosts for end user services) 2A is connected to at least one end user terminal 61 via a network. Each of the hosts (hosts for end user services) 2A manages a lookup table (LUT) which is the above-explained integrated (merged) logical-to-physical address translation table. Each of the hosts (hosts for end user services) 2A manages the only mapping between each of the logical addresses used by the corresponding end user and each of the physical addresses of the resource allocated to the own self by using the own LUT. Therefore, this configuration can easily scale out the system.

The global FTL of each of the hosts 2 comprises a function of managing the lookup table (LUT), a function of implementing high availability, a QoS control function, GC block selection function and the like.

The manager 2B is a device (computer) exclusive for managing the flash storage devices 3. The manager 2B comprises a global resource reservation function of reserving the storage resource of the amount required by each of the hosts 2A. Furthermore, the manager 2B comprises a wear monitoring function of monitoring the degree of wear of each of the flash storage devices 3, a NAND resource allocation function of allocating the reserved storage resource (NAND resource) to each of the hosts 2A, a QoS control function, a global clock management function, and the like.

The low-level abstraction (LLA) of each of the flash storage devices 3 comprises a function of concealing the defective page (bad page), a function of securing the restrictions on page write order, a function of managing the write buffer, a GC execution function, and the like.

According to the system configuration shown in FIG. 3, since the management of each of the flash storage devices 3 is executed by the manager 2B, each of the hosts 2A needs only to execute an operation of transmitting the I/O request to at least one flash storage device 3 allocated to the own host and an operation of receiving a response from the flash storage device 3. In other words, the data transfer between the hosts 2A and the flash storage devices 3 is executed via the only network switch 1 and a manager 2B is not related with the data transfer. In addition, the contents of LUT managed by each of the hosts 2A are independent of each other as explained above. Therefore, since the number of hosts 2A can easily be increased, the scale-out system configuration can be implemented.

FIG. 4 shows a configuration example of the flash storage device 3.

The flash storage device 3 comprises a controller 4 and a nonvolatile memory (NAND flash memory) 5. The flash storage device 3 may comprise a random access memory, for example, a DRAM 6.

The NAND flash memory 5 comprises a memory cell array comprising plural memory cells arranged in a matrix. The NAND flash memory 5 may be a NAND flash memory having a two-dimensional structure or a NAND flash memory having a three-dimensional structure.

The memory cell array of the NAND flash memory 5 includes plural blocks BLK0 to BLKm−1. Each of the blocks BLK0 to BLKm−1 is formed of a number of pages (pages P0 to Pn−1 in this case). The blocks BLK0 to BLKm−1 function as erase units. The blocks may be referred to as "erase blocks", "physical blocks" or "physical erase blocks". Each of the pages P0 to Pn−1 comprises plural memory cells connected to the same word line. The pages P0 to Pn−1 are units for a data write operation and a data read operation.

The controller 4 is electrically connected to the NAND flash memory 5 which is a nonvolatile memory, via a NAND interface 13 such as toggle or open NAND flash interface (ONFI). The controller 4 is a memory controller (control circuit) configured to control the NAND flash memory 5.

As illustrated in FIG. 5, the NAND flash memory 5 comprises plural NAND flash memory dies. Each of the NAND flash memory dies is a nonvolatile memory die comprising a memory cell array comprising plural blocks BLK and a peripheral circuit which controls the memory cell array. The individual NAND flash memory dies can operate independently. For this reason, the NAND flash memory dies function as parallel operation units. The NAND flash memory dies are referred to as "NAND flash memory chips" or "nonvolatile memory chips". FIG. 5 illustrates a case where sixteen channels Ch1, Ch2, . . . Ch16 are connected to the NAND interface 13 and the same number (for example, two dies per channel) of NAND flash memory dies are connected to each of the channels Ch1, Ch2, . . . Ch16. Each of the channels comprises a communication line (memory bus) for communication with the corresponding NAND flash memory dies.

The controller 4 controls NAND flash memory dies #1 to #32 via the channels Ch1, Ch2, . . . Ch16. The controller 4 can simultaneously drive the channels Ch1, Ch2, . . . Ch16.

Sixteen NAND flash memory dies #1 to #16 connected to the channels Ch1 to Ch16 may be formed as a first bank, and remaining sixteen NAND flash memory dies #17 to #32 connected to the channels Ch1 to Ch16 may be formed as a second bank. The banks function as units of causing plural memory modules to be operated in parallel by bank interleaving. In the configuration example shown in FIG. 5, a maximum of thirty-two NAND flash memory dies can be operated in parallel by sixteen channels and the bank interleaving using two banks.

In the present embodiments, the controller 4 may manage plural blocks (hereinafter called super blocks) each of which is composed of the blocks BLK and may execute the erase operation in units of super blocks.

Figure 6:
FIG. 6 is a block diagram showing a configuration example of a super block configured by a set of plural blocks.

The super blocks are not limited to these but may include a total of thirty-two blocks BLK selected from the NAND flash memory dies #1 to #32, respectively. Each of the NAND flash memory dies #1 to #32 may have a multiplane configuration. For example, if each of the NAND flash memory dies #1 to #32 has the multiplane configuration including two planes, one super block may include a total of sixty-four blocks BLK selected from sixty-four planes corresponding to the NAND flash memory dies #1 to #32, respectively. FIG. 6 illustrates a case where one super block SB is composed of a total of thirty-two blocks BLK (i.e., the blocks BLK surrounded by a thick frame in FIG. 5) selected from the NAND flash memory dies #1 to #32, respectively.

As shown in FIG. 4, the controller 4 comprises a host interface 11, a CPU 12, a NAND interface 13, a DRAM interface 14, and the like. The host interface 11, the CPU 12, the NAND interface 13, and the DRAM interface 14 are interconnected via the bus 10.

The host interface 11 is a host interface circuit configured to execute communication with the host 2. The host interface 11 may be, for example, a PCIe controller (NVMe controller). The host interface 11 receives various requests (commands) from the host 2. The requests (commands) include a write request (write command), a read request (read command), and the other various requests (commands).

The CPU 12 is a processor configured to control the host interface 11, the NAND interface 13, and the DRAM interface 14. The CPU 12 loads a control program (firmware) from the NAND flash memory 5 or a ROM (not shown) to the DRAM 6 in response to power-on of the flash storage device 3 and executes various processing by executing the firmware. The firmware may be loaded into SRAM (not shown) in the controller 4. The CPU 12 can execute command processing for processing various commands from the host 2, and the like. Operations of the CPU 12 are controlled by the above-explained firmware executed by the CPU 12. A part or all the command processing may be executed by exclusive hardware in the controller 4.

The CPU 12 can function as a write operation control unit 21, a read operation control unit 22, and a GC operation control unit 23. An application program interface (API) for implementing the system configuration shown at the right part of FIG. 2 is installed in the write operation control unit 21, the read operation control unit 22, and the GC operation control unit 23.

The write operation control unit 21 receives the write request (write command) designating the block number and the logical address from the host 2. The logical address is an identifier capable of identifying data (user data) to be written and may be, for example, LBA, a tag such as a key of a key-value store, or a hash value of the key. The block number is an identifier designating the block to which the data should be written. Various numbers that can uniquely identify an arbitrary one of the blocks can be used as the block number. The block designated by the block number may be a physical block or the above-explained super block. When the write operation control unit 21 receives the write command, the write operation control unit 21 first determines a location (write destination location) in the block (write destination block) having the designated block number, to which the data should be written from the host 2. Next, the write operation control unit 21 writes the data (write data) from the host 2 to the write destination location of the write destination block. In this case, the write operation control unit 21 does not write only the data from the host 2, can write both of the data and the logical address of the data to the write destination block.

Then, the write operation control unit 21 notifies the host 2 of the in-block physical address indicative of the above-explained write destination location of the write destination block. The in-block physical address is represented by an in-block offset indicative of the write destination location in the write destination block.

In this case, the in-block offset is indicative of an offset from the leading part of the write destination block to the write destination location, i.e., an offset of the write destination location relative to the leading part of the write destination block. The size of the offset from the leading part of the write destination block to the write destination location is represented by a multiple of the grain having the size different from the page size. The grain is the above-explained access unit. The maximum value of the size of the grain is restricted to the block size. In other words, the in-block offset represents the offset from the leading part of the write destination block to the write destination location by a multiple of the grain having the size different from the page size.

The grain may have the size smaller than the page size. For example, if the page is 16 K bytes, the size of the grain may be 4 K bytes. In this case, plural offset locations each having the size of 4 K bytes are defined in a certain block. The in-block offset corresponding to the first offset location in the block is, for example, 0, the in-block offset corresponding to the next offset location in the block is, for example, 1, and the in-block offset corresponding to the further next offset location in the block is, for example, 2.

Alternatively, the grain may have the size larger than the page size. For example, the grain may have the size which is several times as large as the page size. If the page is 16 K bytes, the grain may have the size of 32 K bytes.

Thus, the write operation control unit 21 determines the write destination location in the block having the block number from the host 2 by itself and writes the write data from the host 2 to the write destination location in the block. Then, the write operation control unit 21 notifies the host 2 of the in-block physical address (in-block offset) indicative of the write destination location as a response (return value) to the write request. Alternatively, the write operation control unit 21 does not notify the host 2 of only the in-block physical address (in-block offset), may notify the host 2 of a group of the logical address, the block number, and the in-block physical address (in-block offset).

Therefore, the flash storage device 3 can conceal the restrictions on page write order, the bad page, the page size, and the like while urging the host 2 to handle the block number.

As a result, the host 2 can recognize the block boundary, and can manage the user data which exists at each block number without considering the restrictions on page write order, the bad page, and the page size.

If the read operation control unit 22 receives the read request (read command) designating the physical address (i.e., the block number and the in-block offset) from the host 2, the read operation control unit 22 reads the data from the physical storage location to be read, in the block to be read, based on the block number and the in-block offset. The block to be read is specified by the block number. The physical storage location to be read in the block is specified by the in-block offset. The host 2 does not need to handle the page sizes different in each generation of the NAND flash memories, by using the in-block offset.

To obtain the physical storage location to be read, the read operation control unit 22 may first divide the in-block offset by the number of grains (4 if the page size is 16 K bytes and the grain is 4 K bytes) indicative of the page size, and determine a quotient and a remainder obtained by the division as the page number to be read and the in-page offset to be read, respectively.

If the GC operation control unit 23 receives from the host 2 a GC control command designating the copy source block number (GC source block number) and the copy destination block number (GC destination block number) for the garbage collection of the NAND flash memory 5, the GC operation control unit 23 selects a block having the designated copy source block number and a block having the designated copy destination block number, of plural blocks of the NAND flash memory 5, as the copy source block (GC source block) and the copy destination block (GC destination block). The GC operation control unit 23 determines a copy destination location in the GC destination block to which the valid data stored in the selected GC source block should be written, and copies the valid data to the copy destination location in the GC destination block.

Then, the GC operation control unit 23 notifies the host 2 of the logical address of the valid data, the copy destination block number, and the in-block physical address (in-block offset) indicative of the copy destination location in the GC destination block.

Management of valid data/invalid data may be executed by using the block management table 32. The block management table 32 may exist, for example, for each of the blocks. In the block management table 32 corresponding to a certain block, a bit map flag indicative of validity/invalidity of each of the data in this block is stored. The valid data means data which is linked to the logical address as the latest data and which may be read later by the host 2. The invalid data means data which no longer has a possibility of being read from the host 2. For example, data associated with a certain logical address is valid data, and data associated with no logical address is invalid data.

As explained above, the GC operation control unit 23 determines a location (copy destination location) in the copy destination block (GC destination block) to which the valid data stored in the copy source block (GC source block) should be written, and copies the valid data to the determined location (copy destination location) of the copy destination block (GC destination block). In this case, the GC operation control unit 23 may copy both of the valid data and the logical address of the valid data to the copy destination block (GC destination block).

In the present embodiments, as explained above, the write operation control unit 21 can write both of the data (write data) from the host 2 and the logical address from the host 2 to the write destination block. For this reason, since the GC operation control unit 23 can easily acquire the logical address of each of the data in the copy source block (GC source block) from the copy source block (GC source block), the GC operation control unit 23 can easily notify the host 2 of the logical address of the copied valid data.

The NAND interface 13 is a memory control circuit configured to control the NAND flash memory 5 under the control of the CPU 12. The DRAM interface 14 is a DRAM control circuit configured to control the DRAM 6 under the control of the CPU 12. A part of a storage region of the DRAM 6 is used to store the write buffer (WB) 31. In addition, the other part of the storage region in the DRAM 6 is utilized to store the block management table 32. The write buffer (WB) 31 and the block management table 32 may be stored in SRAM (not shown) in the controller 4.

FIG. 7 shows a data write operation of designating the logical address and the block number by the host 2 and determining the in-block physical address (in-block offset) by the flash storage device 3, and a data read operation of designating the block number and the in-block physical address (in-block offset) by the host 2.

The data write operation is executed in the following steps.

(1) When a write processing unit 412 of the host 2 needs to write the data (write data) to the flash storage device 3, the write processing unit 412 may request the flash storage device 3 to allocate the free block. The controller 4 of the flash storage device 3 comprises a block allocation unit 701 which manages free blocks of the NAND flash memory 5. When the block allocation unit 701 receives this request (block allocate request) from the write processing unit 412, the block allocation unit 701 allocates one free block of the free blocks to the host 2 and notifies the host 2 of a block number (BLK #) of the allocated block.

Alternatively, the write processing unit 412 may select the write destination block by itself, in the configuration in which the write processing unit 412 manages the free blocks.

(2) The write processing unit 412 transmits to the flash storage device 3 the write request which designate both of the logical address (for example, LBA) corresponding to the write data and the block number (BLK #) of the write destination block.

(3) The controller 4 of the flash storage device 3 comprises a page allocation unit 702 which allocates a page for data write. When the page allocation unit 702 receives the write request, the page allocation unit 702 determines an in-block physical address (in-block PBA) indicative of the write destination location in the block (write destination block) having the block number designated by the write request. The in-block physical address (in-block PBA) can be represented by the in-block offset as explained above (or simply referred to as the offset). The controller 4 writes the write data from the host 2 to the write destination location in the write destination block, based on both of the block number designated by the write request and the in-block physical address (in-block PBA).

(4) The controller 4 notifies the host 2 of the in-block physical address (in-block PBA) indicative of the write destination location as a response to the write request. Alternatively, the controller 4 may notify the host 2 of the group of the logical address (LBA) corresponding to the write data, the block number (BLK #) of the write destination block, and the in-block PBA (offset) indicative of the write destination location, as the response to the write request. In other words, the controller notifies the host of either the in-block physical address or the group of the logical address, the block number, and the in-block physical address. In the host 2, LUT 411 is updated such that the physical address (block number and in-block physical address (in-block offset)) indicative of the physical storage location to which the write data is written is mapped to the logical address of the write data.

The data read operation is executed in the following steps.

(1)' When the host 2 needs to read the data from the flash storage device 3, the host 2 acquires the physical address (block number and in-block physical address (in-block offset)) corresponding to the logical address of the data to be read, from LUT 411, by referring to LUT 411.

(2)' The host 2 transmits the read request designating the acquired block number and in-block physical address (in-block offset) to the flash storage device 3. When the controller 4 of the flash storage device 3 receives the read request from the host 2, the controller 4 specifies the block to be read and the physical storage location to be read and reads the data from the physical storage location to be read in the block to be read, based on the block number and the in-block physical address.

FIG. 8 shows a write command applied to the flash storage device 3.

The write command is a command to request the flash storage device 3 to write the data. The write command may include the command ID, the block number BLK #, the logical address, the length, and the like.

The command ID is an ID (command code) indicating that this command is the write command, and the command ID for the write command is included in the write command.

The block number BLK # is an identifier (block address) capable of uniquely identifying the block to which the data should be written.

The logical address is an identifier for identifying write data to be written. The logical address may be LBA, a key of a key-value store, or a hash value of the key, as explained above. If the logical address is LBA, the logical address (starting LBA) included in the write command is indicative of a logical location (first logical location) to which the write data should be written.

The length is indicative of the length of the write data to be written. This length (data length) may be designated by the number of grains or the number of LBA, or the size may be designated by bytes.

When the controller 4 receives the write command from the host 2, the controller 4 determines the write destination location in the block having the block number designated by the write command. The write destination location is determined in consideration of the restrictions on page write order, the bad pages, and the like. The controller 4 writes the data from the host 2 to the write destination location in the block having the block number designated by the write command.

FIG. 9 shows a response to the write command shown in FIG. 8.

This response includes the in-block physical address and the length. The in-block physical address is indicative of a location in the block (physical storage location) to which the data is written. The in-block physical address can be designated by the in-block offset as explained above. The length is indicative of the length of the written data. This length (data length) may be designated by the number of grains or the number of LBA, or the size may be designated by bytes.

Alternatively, this response may include not only the in-block physical address and the length, but also the logical address and the block number. The logical address is the logical address included in the write command shown in FIG. 8. The block number is the logical address included in the write command shown in FIG. 8.

FIG. 10 shows Trim command applied to the flash storage device 3.

The Trim command is a command including the block number and the in-block physical address (in-block offset) indicative of the physical storage location in which data to be invalidated is stored. In other words, the Trim command can designate not the logical address such as LBA, but the physical address. The Trim command includes the command ID, the physical address, and the length.

The command ID is an ID (command code) indicating that this command is the Trim command, and the command ID for Trim command is included in the Trim command.

The physical address is indicative of a first physical storage location to which the data to be invalidated is stored. In the present embodiments, the physical address is designated by a combination of the block number and the offset (in-block offset).

The length is indicative of the length of the data to be invalidated. This length (data length) may be designated by the number of grains or bytes.

The controller 4 manages a flag (bit map flag) indicative of validity/invalidity of each of the data included in the plural blocks, by using the block management table 32. If the controller 4 receives from the host 2 the Trim command including the block number and the offset (in-block offset) indicative of the physical storage location in which the data to be invalidated is stored, the controller 4 updates the block management table 32, and changes the flag (bit map flag) corresponding to the data of the physical storage location corresponding to the block number and the in-block offset included in the Trim command to a value indicative of invalidity.

Figure 11:
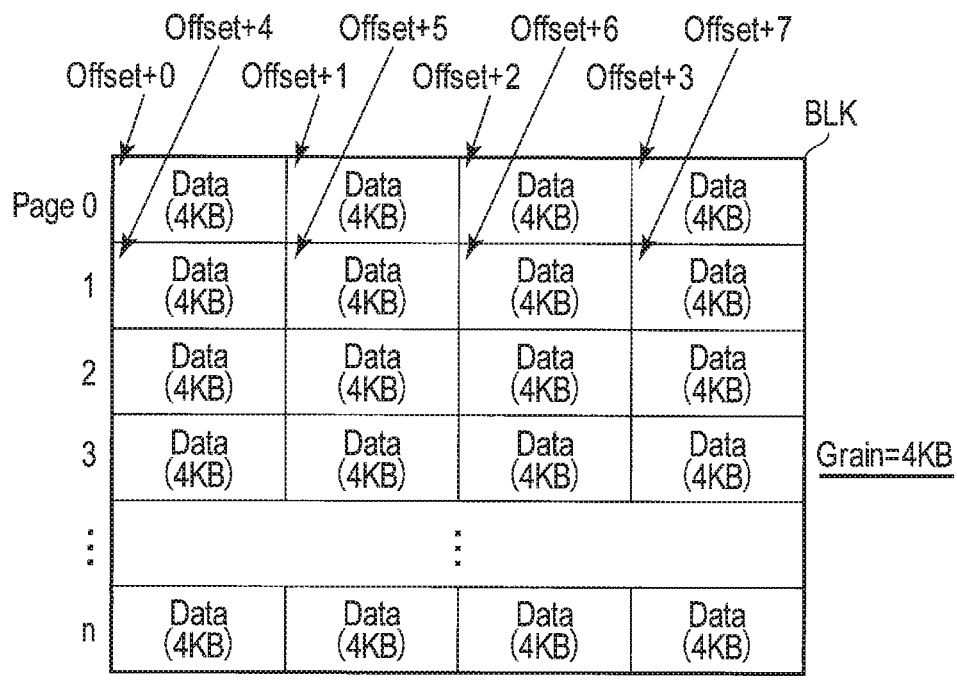
FIG. 11 is a block diagram for explanation of block numbers and offsets indicative of physical addresses.

FIG. 11 shows the in-block offset which defines the in-block physical address.

The block number designates a certain block BLK. Each of the blocks BLK includes plural pages (page 0 to page n in this case) as shown in FIG. 11.

In a case where the page size (user data storing region of each page) is 16 K bytes and the grain is the size of 4 KB, this block BLK is logically divided into 4×(n+1) regions.

Offset +0 is indicative of a first 4 KB region of page 0, offset +1 is indicative of a second 4 KB region of page 0, offset +2 is indicative of a third 4 KB region of page 0, and offset +3 is indicative of a fourth 4 KB region of page 0.

Offset +4 is indicative of a first 4 KB region of page 1, offset +5 is indicative of a second 4 KB region of page 1, offset +6 is indicative of a third 4 KB region of page 1, and offset +7 is indicative of a fourth 4 KB region of page 1.

Figure 12:
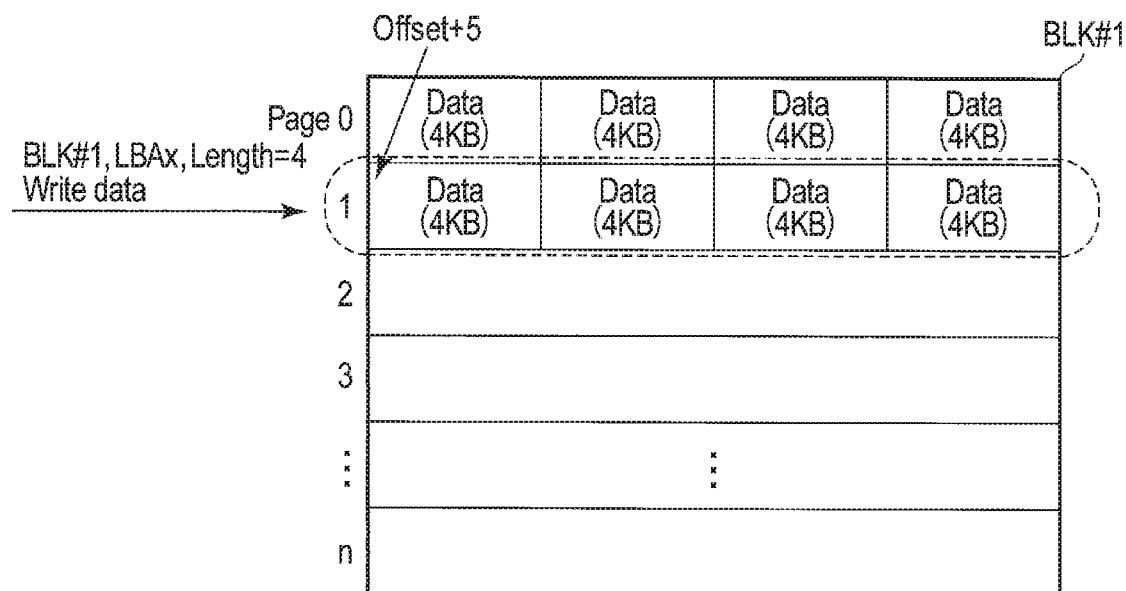
FIG. 12 is a table for explanation of a write operation executed in response to a write command.

FIG. 12 shows a write operation executed in response to a write command.

It is assumed that the block BLK #1 is allocated as the write destination block. The controller 4 writes the data to the block BLK #1 in page units, in order of page 0, page 1, page 2, . . . page n.

In FIG. 11, it is assumed that the write command designating the block number (=BLK #1), the logical address (LBAx), and the length (=4) has been received from the host 2 in a state in which 16 K-byte data have already been written to page 0 of block BLK #1. The controller 4 determines page 1 of block BLK #1 as the write destination location, and writes the 16 K-byte write data received from the host 2 to page 1 of block BLK #1. The controller 4 returns the offset (in-block offset) and the length to the host 2 as the response to the write command. In this case, the offset (in-block offset) is +5, and the length is 4. Alternatively, the controller 4 may return the logical address, the block number, the offset (in-block offset), and the length to the host 2 as the response to the write command. In this case, the logical address is LBAx, the block number is BLK #1, the offset (in-block offset) is +5, and the length is 4.

FIG. 13 shows a write operation for skipping the defective page (bad page).

In FIG. 13, it is assumed that the write command designating the block number (=BLK #1), the logical address (LBAx+1), and the length (=4) has been received from the host 2 in a state in which the data have already been written to page 0 and page 1 of block BLK #1. If page 2 of block BLK #1 is the defective page, the controller 4 determines page 3 of block BLK #1 as the write destination location and writes the 16 K-byte write data received from the host 2 to page 3 of block BLK #1. The controller 4 returns the offset (in-block offset) and the length to the host 2 as the response to the write command. In this case, the offset (in-block offset) is +12 and the length is 4. Alternatively, the controller 4 may return the logical address, the block number, the offset (in-block offset), and the length to the host 2 as the response to the write command. In this case, the logical address is LBAx +1, the block number is BLK #1, the offset (in-block offset) is +12, and the length is 4.

FIG. 14 shows another example of the write operation for skipping the defective page.

In FIG. 14, it is assumed that the data is written across two pages sandwiching the defective page. It is assumed that data have been written to page 0 and page 1 of block BLK #2 and that unwritten 8 K-byte write data remain in the write buffer 31. If the write command designating the block number (=BLK #2), the logical address (LBAy) and the length (=6) is received in this state, the controller 4 prepares 16 K-byte write data corresponding to the page size by using the unwritten 8 K-byte write data and first 8 K-byte write data in 24 K-byte write data newly received from the host 2. Then, the controller 4 writes the prepared 16 K-byte write data to page 2 of block BLK #2.

If next page 3 of block BLK #2 is the defective page, the controller 4 determines page 4 of block BLK #2 as the next write destination location and writes remaining 16 K-byte write data in the 24 K-byte write data received from the host 2 to page 4 of block BLK #2.

The controller 4 returns two offsets (in-block offsets) and two lengths to the host 2 as the response to the write command. In this case, this response may include the offset (=+10), the length (=2), the offset (=+16), and the length (=4). Alternatively, the controller 4 may return LBAy, the block number (=BLK #2), the offset (=+10), the length (=2), the block number (=BLK #2), the offset (=+16), and the length (=4) to the host 2 as the response to the write command.

Figure 15:
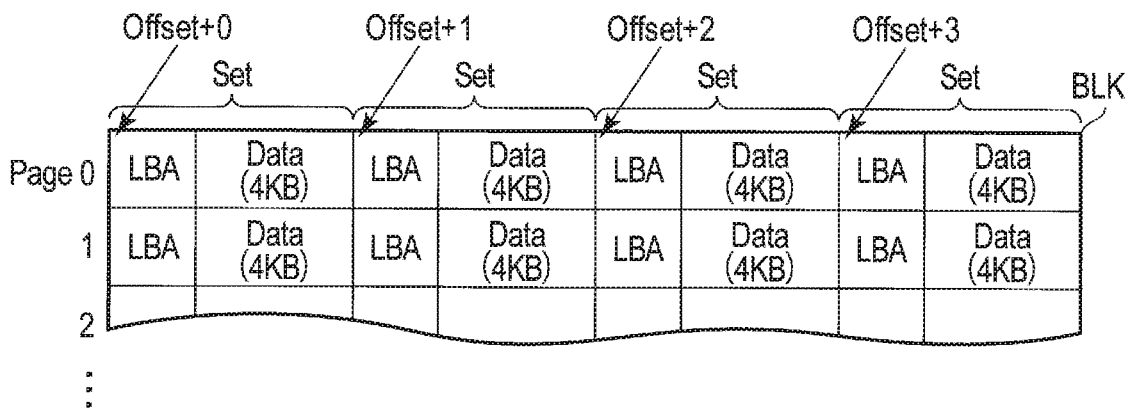
FIG. 15 is a block diagram for explanation of an operation of writing a pair of a logic address and data to a page in a block.
Figure 16:
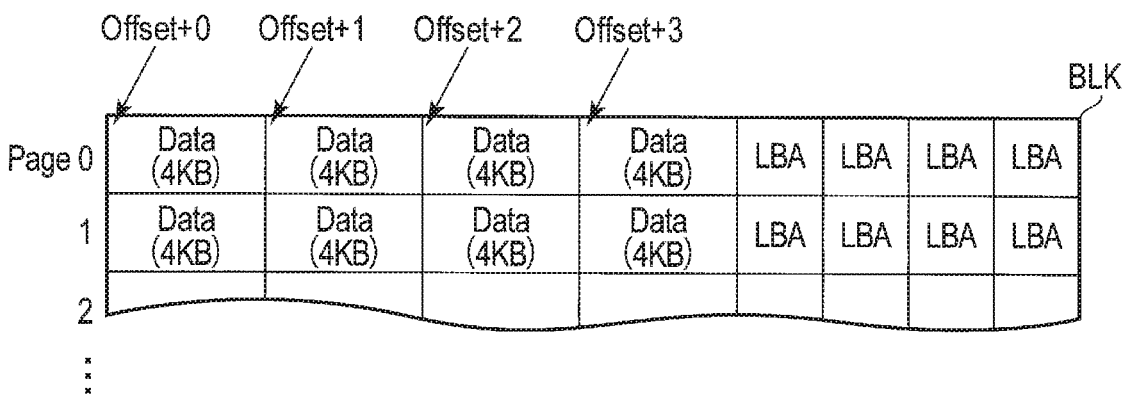
FIG. 16 is a block diagram for explanation of an operation of writing data in a user data region of the page and writing the logic address of the data to a redundant region of the page.

FIG. 15 and FIG. 16 show an operation of writing a pair of the logical address and the data to a page in the block.

In each of the blocks, each page may include a user data region for storing the user data and a redundant region for storing the management data. The page size is over 16 KB.

The controller 4 writes both of 4 KB user data and the logical address (for example, LBA) corresponding to the 4 KB user data to the write destination block BLK. In this case, as shown in FIG. 15, four data sets each including LBA and the 4 KB user data may be written to the same page. The in-block offset may be indicative of the set boundary.

Alternatively, as shown in FIG. 16, four 4 KB user data may be written to user data regions in the page and four LBAs corresponding to these four 4 KB user data may be written to redundant regions in this page.

FIG. 17 shows a relationship between the block number and the offset (in-block offset) in a case of using a super block. The in-block offset is also referred to as offset, simply, in the following explanations.

To simplify the illustration, it is assumed that one super block SB #1 is composed of four blocks BLK #11, BLK #21, BLK #31, and BLK #41. The controller 4 writes the data in order of page 0 of block BLK #11, page 0 of block BLK #21, page 0 of block BLK #31, page 0 of block BLK #41, page 1 of block BLK #11, page 1 of block BLK #21, page 1 of block BLK #31, page 1 of block BLK #41, . . . .

Offset +0 is indicative of a first 4 KB region of page 0 of block BLK #11, offset +1 is indicative of a second 4 KB region of page 0 of block BLK #11, offset +2 is indicative of a third 4 KB region of page 0 of block BLK #11, and offset +3 is indicative of a fourth 4 KB region of page 0 of block BLK #11.

Offset +4 is indicative of a first 4 KB region of page 0 of block BLK #21, offset +5 is indicative of a second 4 KB region of page 0 of block BLK #21, offset +6 is indicative of a third 4 KB region of page 0 of block BLK #21, and offset +7 is indicative of a fourth 4 KB region of page 0 of block BLK #21.

Similarly, offset +12 is indicative of a first 4 KB region of page 0 of block BLK #41, offset +13 is indicative of a second 4 KB region of page 0 of block BLK #41, offset +14 is indicative of a third 4 KB region of page 0 of block BLK #41, and offset +15 is indicative of a fourth 4 KB region of page 0 of block BLK #41.

Offset +16 is indicative of a first 4 KB region of page 1 of block BLK #11, offset +17 is indicative of a second 4 KB region of page 1 of block BLK #11, offset +18 is indicative of a third 4 KB region of page 1 of block BLK #11, and offset +19 is indicative of a fourth 4 KB region of page 1 of block BLK #11.

Offset +20 is indicative of a first 4 KB region of page 1 of block BLK #21, offset +21 is indicative of a second 4 KB region of page 1 of block BLK #21, offset +22 is indicative of a third 4 KB region of page 1 of block BLK #21, and offset +23 is indicative of a fourth 4 KB region of page 1 of block BLK #21.

Similarly, offset +28 is indicative of a first 4 KB region of page 1 of block BLK #41, offset +29 is indicative of a second 4 KB region of page 1 of block BLK #41, offset +30 is indicative of a third 4 KB region of page 1 of block BLK #41, and offset +31 is indicative of a fourth 4 KB region of page 1 of block BLK #41.

FIG. 18 shows a maximum block number get command applied to the flash storage device 3.

The maximum block number get command is a command for acquiring the maximum block number from the flash storage device 3. The host 2 can recognize the maximum block number indicative of the number of blocks included in the flash storage device 3 by transmitting the maximum block number get command to the flash storage device 3. The maximum block number get command includes a command ID for the maximum block number get command, and does not include a parameter.

FIG. 19 shows a response to the maximum block number get command.

When the flash storage device 3 receives the maximum block number get command from the host 2, the flash storage device 3 returns a response shown in FIG. 19 to the host 2. This response includes a parameter indicative of the maximum block number (i.e., the total number of available blocks included in the flash storage device 3).

FIG. 20 shows a block size get command applied to the flash storage device 3.

The block size get command is a command for acquiring the block size from the flash storage device 3. The host 2 can recognize the block size of the NAND flash memory 5 included in the flash storage device 3 by transmitting the block size get command to the flash storage device 3.

In the other embodiments, the block size get command may include a parameter designating the block number. When the flash storage device 3 receives the block size get command designating a certain block number from the host 2, the flash storage device 3 returns the block size of the block having this block number to the host 2. Thus, even if the block size of each of the blocks included in the NAND flash memory 5 is nonuniform, the host 2 can recognize the block size of each of the blocks.

FIG. 21 shows a response to the block size get command.

When the flash storage device 3 receives the block size get command from the host 2, the flash storage device 3 returns the block size (i.e., the block size common to the blocks included in the NAND flash memory 5) to the host 2. In this case, if the block number is designated by the block size get command, the flash storage device 3 returns the block size of the block having this block number to the host 2 as explained above.

FIG. 22 shows a block allocate get command applied to the flash storage device 3.

The block allocate command is a command to request the flash storage device 3 to allocate the block (free block). The host 2 can require the flash storage device 3 to allocate the free block and can thereby acquire the block number (i.e., the block number of the allocated free block), by transmitting the block allocate command to the flash storage device 3.

In a case where the flash storage device 3 manages the free blocks by the free block list and the host 2 does not manage the free blocks, the host 2 requires the flash storage device 3 to allocate a free block and thereby acquires the block number. In contrast, in a case where the host 2 manages the free blocks, the host 2 does not need to transmit the block allocate command to the flash storage device 3 since the host 2 can select one of the free block groups by itself.

FIG. 23 shows a response to the block allocate command.

When the flash storage device 3 receives the block allocate command from the host 2, the flash storage device 3 selects the free block which should be allocated to the host 2, of the free block list, and returns the response including the block number of the selected free block to the host 2.

FIG. 24 shows block information acquisition processing executed by the host 2 and the flash storage device 3.

When the host 2 starts use of the flash storage device 3, the host 2 first transmits the maximum block number get command to the flash storage device 3. The controller of the flash storage device 3 returns the maximum block number to the host 2. The maximum block number is indicative of the total number of available blocks. In a case of using the above-explained super blocks, the maximum block number may be indicative of the total number of available super blocks.

Next, the host 2 transmits the block size get command to the flash storage device 3 and acquires the block size. In this case, the host 2 may transmit the block size get command designating block number 1, the block size get command designating block number 2, the block size get command designating block number 3, . . . to the flash storage device 3 and individually acquire the block size of each of all of the blocks.

The host 2 can recognize the number of available blocks and the block size of each block by the block information acquisition processing.

FIG. 25 shows a sequence of write operation processing executed by the host 2 and the flash storage device 3.

The host 2 first selects the block (free block) which should be used for writing by itself or requests the flash storage device 3 to allocate the free block by transmitting the block allocate command to the flash storage device 3. Then, the host 2 transmits to the flash storage device 3 the write command including block number BLK # of the block selected by itself (or block number BLK # of the free block allocated by the flash storage device 3), the logical address (LBA), and the length (step S20).

When the controller 4 of the flash storage device 3 receives the write command, the controller 4 determines the write destination location in the block (write destination block BLK #) having the block number BLK # to which the data should be written from the host 2 and writes the write data to the write destination location of the write destination block BLK # (step S11). In step S11, the controller 4 may write both of the logical address (LBA in this case) and the write data to the write destination block.

The controller 4 updates the block management table 32 corresponding to the write destination block BLK #, and changes a bit map flag corresponding to the written data (i.e., a bit map flag corresponding to the offset (in-block offset) to which the data has been written) from 0 to 1 (step S12).

Figures 26, 27:
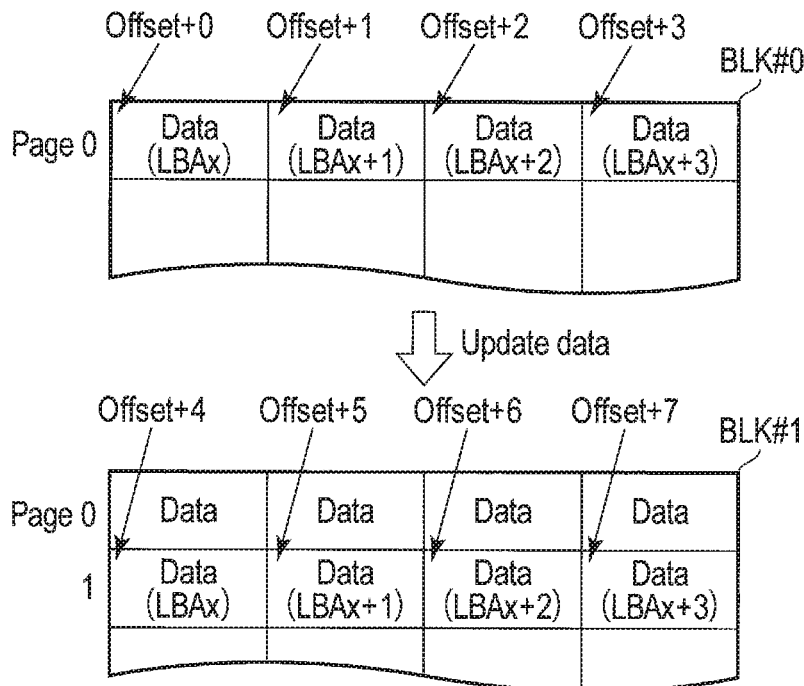
FIG. 26 is a block diagram showing a data update operation of writing update data for already written data.
FIG. 27 is a diagram for explanation of an operation of updating a block management table managed by the memory system according to the embodiments.

It is assumed that as shown in FIG. 26, for example, 16 K-byte update data in which starting LBA is LBAx are written to the physical storage locations corresponding to offsets +4 to +7 of block BLK #1. In this case, as shown in FIG. 27, each of the bit map flags corresponding to offsets +4 to +7 is changed from 0 to 1 in the block management table for block BLK #1.

As shown in FIG. 25, the controller 4 returns a response to the write command to the host 2 (step S13). This response includes at least the offset (in-block offset) to which the data is written.

Figure 28:
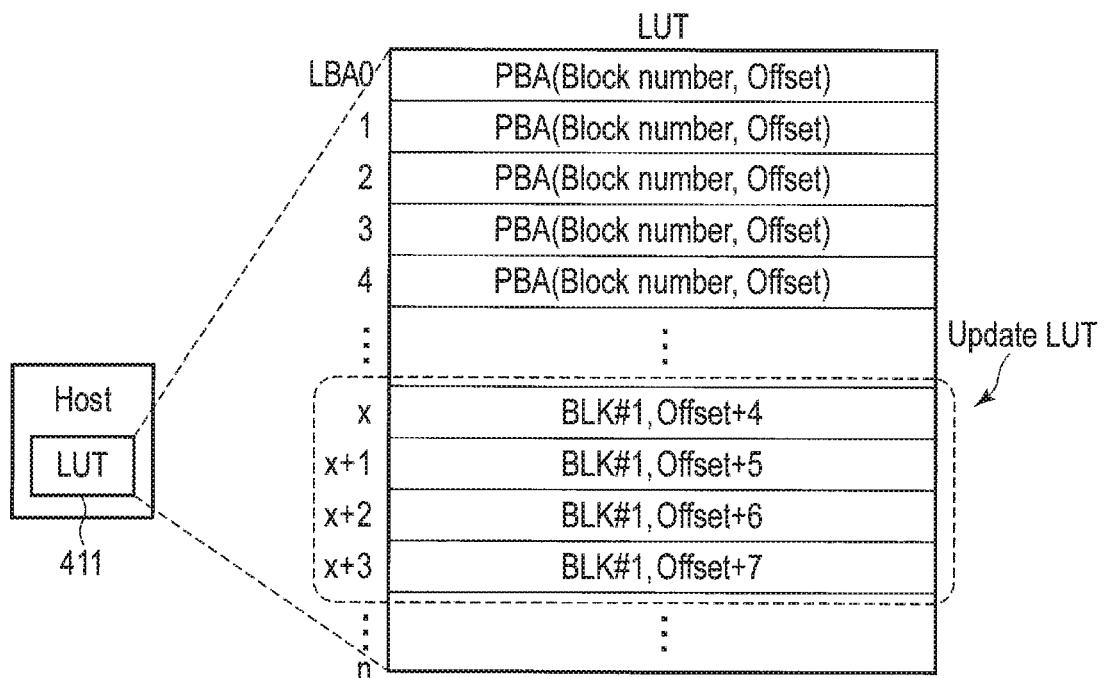
FIG. 28 is a diagram for explanation of an operation of updating a lookup table (logical-to-physical address translation table) managed by the host.

When the host 2 receives this response, the host 2 updates LUT 411 managed by the host 2 and maps the physical address to each of the logical addresses corresponding to the written write data. As shown in FIG. 28, LUT 411 includes plural entries corresponding to the respective logical addresses (for example, LBA). In an entry corresponding to a certain logical address (for example, certain LBA), physical address PBA indicative of the location (physical storage location) in the NAND flash memory 5 in which the data corresponding to LBA is stored, i.e., the block number and the offset (in-block offset) are stored. As shown in FIG. 26, if the 16 K-byte update data in which starting LBA is LBAx are written to the physical storage locations corresponding to offsets +4 to +7 of block BLK #1, LUT 411 is updated, BLK #1 and offset +4 are stored in the entry corresponding to LBAx, BLK #1 and offset +5 are stored in the entry corresponding to LBAx+1, BLK #1 and offset +6 are stored in the entry corresponding to LBAx+2, and BLK #1 and offset +7 are stored in the entry corresponding to LBAx+3 as shown in FIG. 28.

Figure 29:
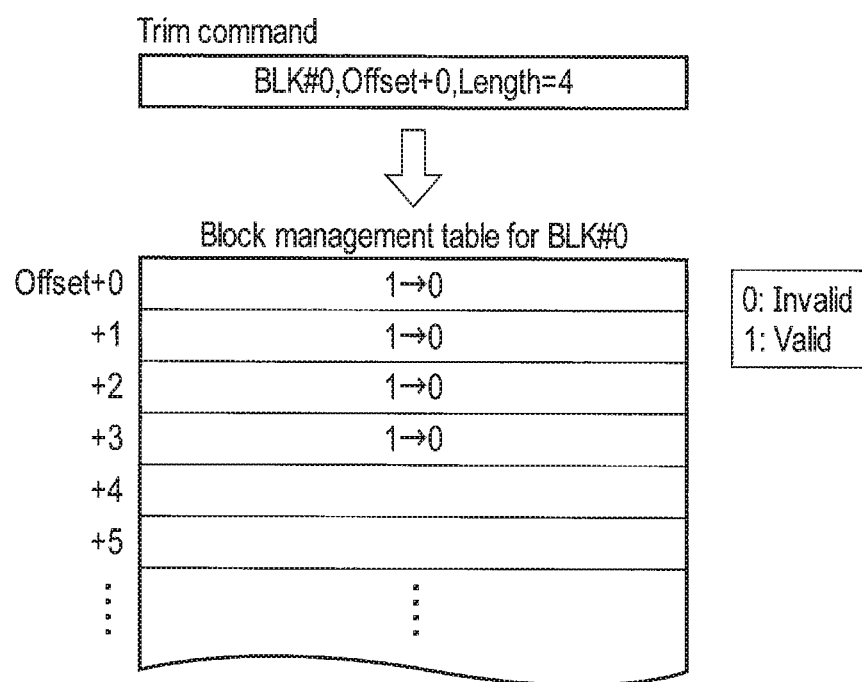
FIG. 29 is a diagram for explanation of an operation of updating the block management table in response to a notification from the host indicative of the block number and the physical address which correspond to data to be invalidated.

As shown in FIG. 25, the host 2 then transmits the Trim command to invalidate previous data which become unnecessary due to write of the above update data, to the flash storage device 3. As shown in FIG. 26, if the previous data are stored in the locations corresponding to offset +0, offset +1, offset +2, and offset +3 of block BLK #0, the Trim command designating the block number (=BLK #0), the offset (=+0), and the length (=4) is transmitted from the host 2 to the flash storage device 3 as shown in FIG. 29. The controller 4 of the flash storage device 3 updates the block management table 32 in response to the Trim command (FIG. 25, step S14). In step S15, as shown in FIG. 29, each of the bit map flags corresponding to offsets +0 to +3 is changed from 1 to 0 in the block management table for block BLK #0.

FIG. 30 shows a read command applied to the flash storage device 3.

The read command is a command to request the flash storage device 3 to read the data. The read command includes the command ID, the physical address PBA, the length, and the transfer destination pointer.

The command ID is an ID (command code) indicating that this command is the read command, and the command ID for the read command is included in the read command.

The physical address PBA is indicative of a first physical storage location from which the data should be read. The physical address PBA is designated by the block number and the offset (in-block offset).

The length is indicative of the length of the data to be read. The data length can be designated by the number of grains.

The transfer destination pointer is indicative of the location on the memory in the host 2 to which the read data is to be transferred.

One read command can designate plural groups of the physical addresses PBA (block numbers and offsets) and the lengths.

FIG. 31 shows a read operation.

It is assumed here that the read command designating the block number (=BLK #2), the offset (=+5), and the length (=3) is received from the host 2. The controller 4 of the flash storage device 3 reads data d1 to d3 from BLK #2, based on the block number (=BLK #2), the offset (=+5), and the length (=3). In this case, the controller 4 reads the data for one page size from page 1 of BLK #2 and extracts data d1 to data d3 from the read data. Next, the controller 4 transfers data d1 to data d3 on a host memory designated by a transfer destination pointer.

FIG. 32 shows an operation of reading data portions stored in respective different physical storage locations in response to the read command from the host 2.

It is assumed here that the read command designating the block number (=BLK #2), the offset (=+10), the length (=2), the block number (=BLK #2), the offset (=+16), and the length (=4) is received from the host 2. The controller 4 of the flash storage device 3 reads data of one page size from page 2 of BLK #2, based on the block number (=BLK #2), the offset (=+10), and the length (=2), and extracts data d1 to d2 from the read data. Next, the controller 4 reads data (data d3 to data d6) of one page size from page 4 of BLK #2, based on the block number (=BLK #2), the offset (=+16), and the length (=4). Then, the controller 4 transfers the read data of the length (=6) obtained by combining data d1 to data d2 with data d3 to data d6, to the host memory designated by a transfer destination pointer in the read command.

Thus, even if a defective page is included in the block, the data part can be read from a separate physical storage location without causing a read error. In addition, even if data is written across two blocks, the data can be read by issuing one read command.

Figures 33, 34:
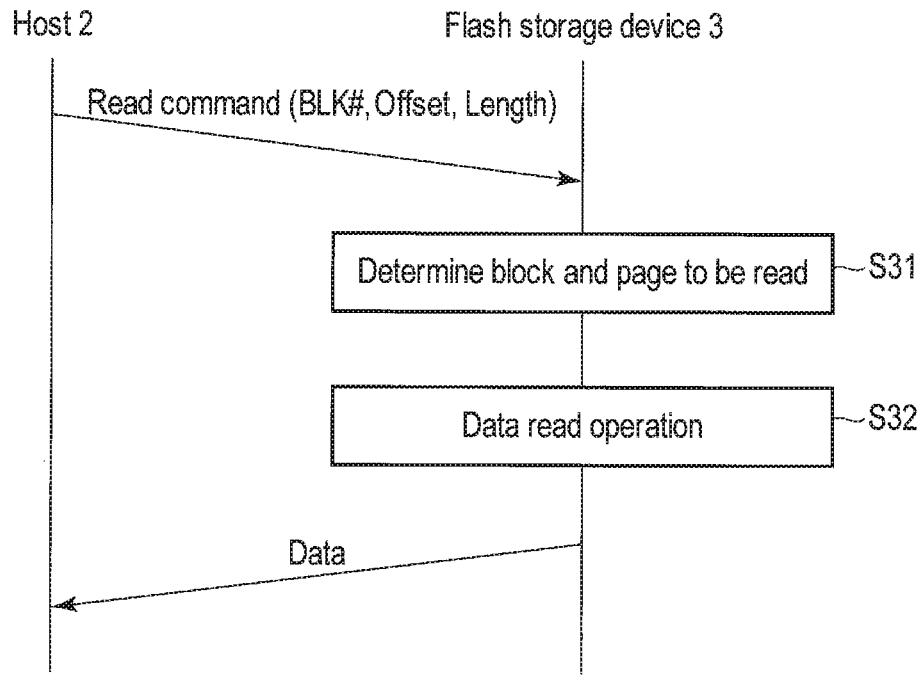
FIG. 33 is a sequence chart showing a sequence of read processing executed by the host and the memory system according to the embodiments.
FIG. 34 is a table for explanation of a garbage collection (GC) control command applied to the memory system according to the embodiments.

FIG. 33 shows a sequence of read processing executed by the host 2 and the flash storage device 3.

The host 2 translates the logical address included in the read request from the user application into the block number and the offset by referring to LUT 411 managed by the host 2. Then, the host 2 transmits the read command designating the block number, the offset, and the length to the flash storage device 3.

When the controller 4 of the flash storage device 3 receives the read command from the host 2, the controller 4 determines the block corresponding to the block number designated by the read command as the block to be read, and determines the page to be read, based on the offset designated by the read command (step S31). In step S31, the controller 4 may first divide the offset designated by the read command by the number (4 in this case) of the grains indicative of the page size. Then, the controller 4 may determine a quotient and a remainder obtained by the division as the page number to be read and the in-page offset location to be read, respectively.

The controller 4 reads the data defined by the block number, the offset, and the length from the NAND flash memory 5 (step S32) and transmits the read data to the host 2.

FIG. 34 shows a GC control command applied to the flash storage device 3.

The GC control command is used to notify the flash storage device 3 of the GC source block number and the GC destination block number. The host 2 manages the valid data amount/invalid data amount of each block, and can select several blocks in which the valid data amount is smaller as the GC source blocks. In addition, the host 2 manages the free block list, and can select several free blocks as the GC destination blocks. The GC control command may include the command ID, the GC source block number, the GC destination block number, and the like.

The command ID is the ID (command code) indicating that this command is the GC control command, and the command ID for the GC control command is included in the GC control command.

The GC source block number is a block number indicative of the GC source block. The host 2 can designate the block which should be the GC source block. The host 2 may set plural GC source block numbers to one GC control command.

The GC destination block number is a block number indicative of the GC destination block. The host 2 can designate the block which should be the GC destination block. The host 2 may set plural GC destination block numbers to one GC control command.

FIG. 35 shows a callback command for GC.

The callback command for GC is used to notify the host 2 of the logical address of the valid data copied by GC, and the block number and the offset indicative of the copy destination location of the valid data.

The callback command for GC may include the command ID, the logical address, the length, and a destination physical address.

The command ID is the ID (command code) indicating that this command is the callback command for GC, and the command ID for the callback command for GC is included in the callback command for GC.

The logical address is indicative of a logical address of the valid data copied from the GC source block to the GC destination block by GC.

The length is indicative of the length of the copied data. The data length may be designated by the number of grains.

The destination physical address is indicative of a location in the GC destination block in which the valid data is copied. The destination physical address is designated by the block number and the offset (in-block offset).

FIG. 36 shows a procedure of the garbage collection (GC) operation.

For example, if the number of remaining free blocks included in the free block list managed by the host 2 is reduced to a threshold value or less, the host 2 selects the GC source block and the GC destination block and transmits the GC control command designating the selected GC source block and the selected GC destination block to the flash storage device 3 (step S41). Alternatively, when the number of remaining free blocks becomes smaller than or equal to the threshold value, in a configuration in which the write processing unit 412 manages the free blocks, the write processing unit 412 may notify the host 2 of the reduction in the number of the free blocks and the host 2 receiving the notification may select the blocks and transmit the GC control command.

When receiving this GC control command, the controller 4 of the flash storage device 3 executes a data copy operation including an operation of determining a location (copy destination location) in the GC destination block to which the valid data in the GC source block should be written, and an operation of copying the valid data in the GC source block to the copy destination location in the GC destination block (step S51). In step S51, the controller 4 does not copy only the valid data in the GC source block (copy source block), but copies both of the valid data and the logical address corresponding to the valid data from the GC source block (copy source block) to the GC destination block (copy destination block). A pair of the data and the logical address can be thereby held in the GC destination block (copy destination block).

In addition, in step S51, the data copy operation is repeated until copying all of the valid data in GC source block is completed. If plural GC source blocks are designated by the GC control command, the data copy operation is repeated until copying all of the valid data in all of the GC source blocks is completed.

Then, the controller 4 notifies the host 2 of the logical address (LBA) of the valid data, the destination physical address indicative of the copy destination location of the valid data, and the like, for each copied valid data, by using the callback command for GC (step S52). The destination physical address corresponding to certain valid data is represented by the block number of the copy destination block (GC destination block) to which the valid data is copied, and the in-block physical address (in-block offset) indicative of the physical storage location in the copy destination block to which the valid data is copied.

When the host 2 receives this callback command for GC, the host 2 updates LUT 411 managed by the host 2 and maps the destination physical address (block number and in-block offset) to the logical address corresponding to each of the copied valid data (step S42).

FIG. 37 shows an example of a data copy operation executed for GC.

In FIG. 37, it is assumed that the valid data (LBA=10) stored in the location corresponding to offset +4 of the GC source block (block BLK #50 in this case) is copied to the location corresponding to offset +0 of the GC destination block (block BLK #100 in this case) and that the valid data (LBA=20) stored in the location corresponding to offset +10 of the GC source block (block BLK #50 in this case) is copied to the location corresponding to offset +1 of the GC destination block (block BLK #100 in this case). In this case, the controller 4 notifies the host of {LBA10, BLK #100, offset (=+0), LBA20, BLK #100, and offset (=+1)} (callback processing for GC).

FIG. 38 shows contents of LUT 411 of the host 2 updated based on a result of the data copy operation shown in FIG. 37.

In the LUT 411, the block number and the offset corresponding to LBA 10 are updated from BLK #50 and offset (=+4) to BLK #100 and offset (=+0). Similarly, the block number and the offset corresponding to LBA 20 are updated from BLK #50 and offset (=+10) to BLK #100 and offset (=+1).

After the LUT 411 is updated, the host 2 may transmit the Trim command designating BLK #50 and offset (=+4) to the flash storage device 3 and invalidate the data stored in the location corresponding to offset (=+4) of BLK #50. Furthermore, the host 2 may transmit the Trim command designating BLK #50 and offset (=+10) to the flash storage device 3 and invalidate data stored in the location corresponding to offset (=+10) of BLK #50.

Alternatively, the host 2 may not transmit the Trim command, but the controller 4 may update the block management table 32 and invalidate the data as a procedure of the GC processing.

As explained above, according to the present embodiments, when the controller 4 of the flash storage device 3 receives the write request designating the first logical address and the first block number from the host 2, the controller 4 determines the first location (write destination location) in the block (write destination block) having the first block number, to which the data should be written from the host 2, writes the data from the host 2 to the first location (write destination location) of the write destination block, and notifies the host 2 of either the first in-block physical address indicative of the first location, or the group of the first logical address, the first block number and the first in-block physical address.

Therefore, the configuration in which the host 2 handles the block number and the flash storage device 3 determines the write destination location (in-block offset) in the block having the block number designated by the host 2 by considering the restrictions on page write order/bad page, and the like can be implemented. By handling the block number by the host 2, merge of the application-level address translation table of the upper layer (host 2) with the LUT-level address translation table of the conventional SSD can be implemented. In addition, the flash storage device 3 can control the NAND flash memory 5 in consideration of the characteristics/restrictions of the NAND flash memory 5. Furthermore, since the host 2 can recognize the block boundary, the host 2 can write the user data to each block in consideration of the block boundary/block size. Since the host 2 can thereby execute the control such as simultaneously invalidating the data in the same block by data update or the like, the frequency at which GC is executed can be reduced. As a result, the write amplification can be lowered, the performance of the flash storage device 3 can be improved, and the life of the flash storage device 3 can be extended to the maximum value.

Therefore, appropriate role sharing between the host 2 and the flash storage device 3 can be implemented, and improvement of the I/O performance of the entire system including the host 2 and the flash storage device 3 can be thereby attempted.

In addition, if the controller 4 of the flash storage device 3 receives from the host 2 the control command designating the copy source block number and the copy destination block number for garbage collection, the controller 4 of the flash storage device 3 selects the second block having the copy source block number and the third block having the copy destination block number, of plural blocks, determines the copy destination block in the third block to which the valid data stored in the second block should be written, and copies the valid data to the copy destination block of the third block. Then, the controller notifies the host 2 of the logical address of the valid data, the copy destination block number, and the second in-block physical address indicative of the copy destination location in the third block. In GC, too, the configuration that the host 2 handles the only block numbers (copy source block number and copy source block number) and the flash storage devices 3 determines the copy destination location in the copy destination block can be thereby implemented.

The flash storage device 3 may be utilized as one of plural flash storage devices 3 provided in the storage array. The storage array may be connected to the information processing device such as a server computer via a cable or a network. The storage array comprises a controller which controls the flash storage devices 3 in the storage array. If the flash storage devices 3 are applied to the storage array, the controller of the storage array may function as the host 2 of the flash storage devices 3.

In addition, in the present embodiments, the NAND flash memory has been explained as an example of a nonvolatile memory. However, the functions of the present embodiments are also applicable to the other various nonvolatile memories such as a magnetoresistive random access memory (MRAM), a phase change random access memory (PRAM), a resistive random access memory (ReRAM) and a ferroelectric random access memory (FeRAM).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method of controlling a nonvolatile memory, the nonvolatile memory including a plurality of blocks, each of the plurality of blocks being a unit for data erase operation, each of the plurality of blocks including a plurality of pages, each of the plurality of pages being a unit for data write operation, said method comprising:
   in response to receiving, from a host, a copy command that includes a first identifier:
      determining first data in a first block among the plurality of blocks, the first data corresponding to the first identifier included in the copy command;
      determining a second block among the plurality of blocks;
      determining a first page among the plurality of pages of the second block;
      copying the first data from the first block to the first page of the second block; and
      notifying the host of:
         a second identifier corresponding to the second block; and
         a third identifier corresponding to the first page of the second block.

2. The method according to claim 1, wherein
   the copy command further includes the second identifier, and the method further comprises:
   determining the second block on the basis of the second identifier included in the copy command.

3. The method according to claim 1, wherein
   the third identifier is not included in the copy command.

4. The method according to claim 1, further comprising:
   writing, into the second block, a first logical address associated with the first data.

5. The method according to claim 4, further comprising:
notifying the host of the first logical address associated with the first data.

6. The method according to claim 1, wherein
the copy command is issued for garbage collection operation.

7. A method of controlling a nonvolatile memory, the nonvolatile memory including a plurality of blocks, each of the plurality of blocks being a unit for data erase operation, said method comprising:
in response to receiving, from a host, a copy command that includes a first identifier:
determining first data in a first block among the plurality of blocks, the first data corresponding to the first identifier included in the copy command;
determining a second block among the plurality of blocks;
copying the first data from the first block to the second block; and
writing, into the second block, a first logical address associated with the first data.

8. The method according to claim 7, wherein
the copy command further includes a second identifier, and the method further comprises:
determining the second block on the basis of the second identifier included in the copy command.

9. The method according to claim 7, wherein
each of the plurality of blocks includes a plurality of pages, each of the plurality of pages being a unit for data write operation, and the method further comprises:
determining a first page among the plurality of pages of the second block; and
copying the first data from the first block to the first page of the second block.

10. The method according to claim 7, further comprising:
notifying the host of:
a second identifier corresponding to the second block; and
the first logical address associated with the first data.

11. The method according to claim 7, wherein
the copy command is issued for garbage collection operation.

12. A method of controlling a memory system, the memory system including a nonvolatile memory that includes a plurality of blocks, each of the plurality of blocks being a unit for data erase operation, said method comprising:
transmitting, to the memory system, a copy command that includes a first identifier;
in response to receiving a completion response for the copy command from the memory system that has copied first data from a first block to a second block, the first data corresponding to the first identifier, updating a mapping table to map a first logical address from a second identifier to a third identifier, the first logical address being associated with the first data, the second identifier corresponding to the first block, the third identifier corresponding to the second block.

13. The method according to claim 12, wherein
the copy command further includes the third identifier.

14. The method according to claim 12, wherein
each of the plurality of blocks includes a plurality of pages, each of the plurality of pages being a unit for data write operation, and
the first data is coped from the first block to a first page of the second block.

15. The method according to claim 12, wherein
the copy command is issued for garbage collection operation.

16. The method according to claim 12, wherein
the copy command further includes a fourth identifier, and the method further comprises:
in response to receiving the completion response for the copy command from the memory system that has copied second data from the first block to the second block, the second data corresponding to the fourth identifier, updating the mapping table to map a second logical address from the second identifier to the third identifier, the second logical address being associated with the second data.

* * * * *